United States Patent
Sugiyama et al.

(10) Patent No.: US 7,395,889 B2
(45) Date of Patent: Jul. 8, 2008

(54) HYBRID DRIVE UNIT FOR VEHICLES

(75) Inventors: Masataka Sugiyama, Susono (JP);
Masatoshi Adachi, Nishikamo-gun (JP);
Hideaki Komada, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 373 days.

(21) Appl. No.: 11/119,965

(22) Filed: May 3, 2005

(65) Prior Publication Data

US 2006/0011395 A1    Jan. 19, 2006

(30) Foreign Application Priority Data

May 20, 2004    (JP)    ............... 2004-150845

(51) Int. Cl.
*B60K 1/00*    (2006.01)
(52) U.S. Cl. .............. 180/65.2; 180/65.4; 180/243
(58) Field of Classification Search ......... 180/242, 180/243, 65.2, 65.3, 65.4, 65.6
See application file for complete search history.

(56) References Cited

U.S. PATENT DOCUMENTS

| | | | |
|---|---|---|---|
| 6,053,833 A | | 4/2000 | Masaki |
| 6,306,056 B1 * | | 10/2001 | Moore ............... 475/5 |
| 6,371,878 B1 | | 4/2002 | Bowen |
| 6,557,656 B2 * | | 5/2003 | Haniu et al. ............ 180/65.6 |
| 6,691,809 B2 * | | 2/2004 | Hata et al. ............. 180/65.3 |
| 6,732,526 B2 | | 5/2004 | Minagawa et al. |
| 7,001,296 B2 | | 2/2006 | Yamauchi et al. |
| 7,140,461 B2 * | | 11/2006 | Morrow ............. 180/65.2 |
| 2001/0034572 A1 | | 10/2001 | Yamaguchi et al. |
| 2003/0069104 A1 | | 4/2003 | Nakano et al. |

FOREIGN PATENT DOCUMENTS

| | | |
|---|---|---|
| DE | 199 03 936 | 5/2000 |
| DE | 699 28 846 T2 | 8/2006 |
| EP | 1 247 679 A2 | 10/2002 |
| EP | 1 396 369 A2 | 3/2004 |
| JP | 2000-142138 | 5/2000 |
| JP | 2000-142146 | 5/2000 |
| JP | 2000-346187 | 12/2000 |
| JP | 2002-78105 | 3/2002 |
| JP | 2002-78110 | 3/2002 |
| JP | 2002-274201 | 9/2002 |

(Continued)

*Primary Examiner*—Christopher Ellis
*Assistant Examiner*—Brian Swenson
(74) *Attorney, Agent, or Firm*—Oblon, Spivak, McClelland, Maier & Neustadt, P.C.

(57) ABSTRACT

A hybrid drive unit for vehicles, in which a power distribution device is arranged in a power transmission route between an engine and a wheel, in which the power distribution device has a first to fourth rotary elements capable of rotating differentially with one another, in which a first motor generator is connected to the second rotary element and a wheel is connected to the fourth rotary element, and which is capable of steplessly controlling a speed change ratio of the first rotary element and the fourth rotary element of the power distribution device comprising: a second motor generator connected to the third rotary element of the power distribution device; a third motor generator connected to the wheel in a power transmittable manner; and an electric circuit for allowing exchange of electric power among individual motor generators.

36 Claims, 10 Drawing Sheets

FOREIGN PATENT DOCUMENTS

| | | |
|---|---|---|
| JP | 2002-281607 | 9/2002 |
| JP | 2003-32802 | 1/2003 |
| JP | 2003-164007 | 6/2003 |
| JP | 2003-278856 | 10/2003 |
| JP | 2003-291661 | 10/2003 |
| JP | 2003-343667 | 12/2003 |

* cited by examiner

HYBRID DRIVE UNIT FOR VEHICLES

BACKGROUND OF THE INVENTION

1. Field of the Invention

This invention relates to a hybrid drive unit for vehicles having a plurality of prime movers such as an engine and a motor generator.

The disclosure of Japanese Patent Application No. 2004-150845 filed on May 20, 2004 including specification, drawings and claims is incorporated herein by reference in its entirety.

2. Discussion of the Related Art

A hybrid vehicle, which has an engine and a motor generator as a prime mover, is known in the art. This kind of hybrid vehicle is capable of improving the fuel consumption and abating emission by utilizing the characteristics of the engine and the motor generator. One example of the hybrid vehicle thus having the engine and the motor generator as a prime mover is disclosed in Japanese Patent Laid-Open No. 2000-346187.

The hybrid vehicle disclosed in Japanese Patent Laid-Open No. 2000-346187 comprises an engine and an assist motor as a prime mover, and a planetary gear mechanism is arranged between the engine and a drive shaft. The planetary gear mechanism comprises three rotary elements such as a sun gear, a ring gear, and a carrier holding a pinion gear meshing with the sun gear and the ring gear. In the planetary gear mechanism, the carrier is connected to the engine side, and the ring gear is connected to the drive shaft. The assist motor is also connected to the drive shaft, and a motor is connected to the sun gear.

There is provided a transmission in the route from the engine to the carrier. The transmission comprises three rotary elements such as a sun gear, a ring gear, and a carrier holding a pinion gear meshing with the sun gear and the ring gear. In the transmission, the carrier of the transmission is connected to the engine, and the ring gear of the transmission is connected to the carrier of the planetary gear mechanism. Moreover, there are provided a clutch for allowing integral rotation between the carrier and the ring gear of the transmission, and a brake for selectively halting the rotation of the sun gear of the transmission. Additionally, a battery is connected to the motor and the assist motor.

The torque outputted from the ring gear is transmitted to the drive shaft by using the motor to function as a reaction element while inputting an engine torque to the carrier of the planetary gear unit. The motor functioning as the reaction element carries out a regenerative control (i.e., an electric power generating control), and generated electric power is stored in a battery. It is possible to control a speed change ratio steplessly by controlling the speed of the motor. Here, the speed change ratio is a speed ratio of the carrier of the planetary gear unit and the ring gear of the planetary gear unit. Namely, the planetary gear unit functions as a continuously variable transmission utilizing a differential action of the three rotary elements. It is also possible to fill in the gap between a demand torque of the vehicle and an engine torque transmitted to a drive shaft by driving an assist motor.

In case the brake is applied and the clutch is released, the speed of the ring gear of the transmission increases in comparison with the engine speed. On the contrary, in case the brake is released and the clutch is applied, the output shaft of the engine and the ring gear of the transmission rotate integrally. Besides, the hybrid vehicle having a plurality of prime movers such as the engine and the motor generator is disclosed also in Japanese Patent Laid-Open No. 2002-78105, Japanese Patent Laid-Open No. 2000-142146, and Japanese Patent Laid-Open No. 2003-32802.

According to the hybrid vehicle taught by Japanese Patent Laid-Open No. 2000-346187, it is necessary to increase the speed of the motor functioning as the reaction element in order to increase the speed ratio between the speed of the carrier of the planetary gear unit and the speed of the drive shaft. That is, in order to run the vehicle at low speed by keeping the engine speed at a predetermined speed, the motor functioning as the reaction element has to have a high output so that the size of the motor may be large. In order to reduce the speed ratio between the speed of the carrier of the planetary gear unit and the speed of the drive shaft, a drive torque is applied to the sun gear of the planetary gear unit in a counter direction by reversing the motor, and a synthesis of the engine torque and the drive torque of the motor is outputted from the ring gear to the drive shaft. On the other hand, the assist motor carries out a regeneration of the energy and the generated electric power is supplied to the motor. Therefore, power circulation may occur.

SUMMARY OF THE INVENTION

An object of the present invention is to provide a hybrid drive unit for vehicles, which can suppress increase in size and capacity of a motor generator for establishing a reactive force against engine torque, and which can avoid an occurrence of power circulation.

Accordingly, a hybrid drive unit of the invention comprises a power distribution device for distributing an output torque of an engine to a first motor generator and to a wheel. The power distribution device comprises: a first rotary element as an input element; a second rotary element capable of functioning as a reaction element; a third rotary element capable of functioning as an another reaction element; and a fourth rotary element as an output element. The engine is connected to the first rotary element; the first motor generator is connected to the second rotary element; and the wheel is connected to the fourth rotary element. The hybrid drive unit of the invention further comprises: a second motor generator connected to the third rotary element; a third motor generator connected to any of the wheel and the another wheel; and an electric circuit which allows exchange of the electric power among aforementioned motor generators.

According to the invention, therefore, the output of each motor generator can be reduced as small as possible, by inputting the engine torque to the first rotary element, and by selectively operating at least one of the first and the second motor generators as a generator to establish reactive force against the engine torque, when the engine torque is outputted from the fourth rotary element. As a result, it is possible to suppress increase in size and capacity of the motor generators. For this reason, it is possible to suppress a rise in a rate of conversion of the engine power into the electric power, and an amount of the electric energy in an electric circuit is thereby suppressed. Moreover, in case one of the motor generator is operated as a generator and functioning as the reaction element against the engine torque, it is possible to avoid occurrence of the power circulation by supplying the third motor generator with the regenerated electric power to allow it to function as a motor.

In addition to the above construction, the hybrid drive unit of the invention comprises: a first control means or a first control device for transmitting the engine torque to the fourth rotary element, by operating the second motor generator as a motor or a generator to establish reactive force against the engine torque, while transmitting the torque of the third motor generator to the wheel by operating the third motor generator as a motor, in case of controlling the speed of the fourth rotary element lower than that of the first rotary element when the engine torque is being transmitted to the first rotary element.

According to the invention, therefore, it is possible to transmit the engine torque to the fourth rotary element by operating the second motor generator as a generator and establishing reactive force against the engine torque, while transmitting the torque of the third motor generator to the wheel by operating the third motor generator as a motor, in case of controlling the speed of the fourth rotary element lower than that of the first rotary element when the engine torque is being transmitted to the first rotary element. In addition, in case the second motor generator functions as a generator, it is also possible to supply the regenerated electric power to the third motor generator.

Moreover, the hybrid drive unit of the invention comprises: a second control means or a second control device for transmitting at least one of the torque of the second and third motor generators to the wheel, by operating the first motor generator as a generator and establishing the reactive force against the engine torque, while operating at least one of the second and third motor generators as a motor, in case of controlling the speed of the fourth rotary element higher than that of the first rotary element while transmitting the engine torque to the first rotary element.

According to the invention, therefore, at least one of the torque of the second and third motor generators is transmitted to the wheel, by operating the first motor generator as a generator and establishing the reactive force against the engine torque, and by operating at least one of the second and third motor generators as a motor, in case of controlling the speed of the fourth rotary element higher than that of the first rotary element while transmitting the engine torque to the first rotary element. In addition, in case the first motor generator functions as a generator, it is also possible to supply the regenerated electric power to at least one of the second and third motor generators.

Moreover, the hybrid drive unit of the invention comprises: a third control means or a third control device for allowing the brake to function as a reaction element against at least one of the second and third motor generators, by using the brake to halt the first rotary element and the engine, in case of transmitting the torque of at least one of the second and third motor generators to the wheel by operating at least one of the second and third motor generators as a motor.

According to the invention, therefore, the brake functions as the reaction element against at least one of the second and the third motor generators by using the brake to halt the first rotary element and the engine, in case of transmitting the torque of at least one of the second and third motor generators to the wheel by operating at least one of the second and third motor generators as a motor.

In addition to the above construction, the hybrid drive unit of the invention comprises: a fourth control means or a fourth control device for rotating the engine autonomously, (i) by allowing the first motor generator to function as a reaction element against at least one of the second and third motor generators by operating the first motor generator as a generator and by reducing the braking force of the brake, (ii) by increasing the speed of the engine by controlling the speed of the first motor generator, and (iii) by burning fuel, in case of starting the engine after the first rotary member and the engine are halted by the brake.

According to the invention, therefore, in case of starting the engine after the first rotary member and the engine are halted by the brake, the engine speed is increased: by allowing the first motor generator to function as a reaction element against at least one of the second and third motor generators, by operating the first motor generator as a generator, and by reducing the braking force of the brake; and by controlling the speed of the first motor generator.

Moreover, the hybrid drive unit of the invention comprises: a fifth control means or a fifth control device for allowing at least one of the first and second motor generators to function as a generator to establish reactive force against the engine torque, in case the engine torque is inputted to the first rotary element and transmitted to the wheel through the fourth rotary element.

According to the invention, therefore, at least one of the first and second motor generators functions as a generator to establish reactive force against the engine torque, in case the engine torque is inputted to the first rotary element and transmitted to the wheel through the fourth rotary element.

In addition, according to the hybrid drive unit of the invention, the fifth control means or the fifth control device includes a means for selecting the motor generator to be operated as a generator, whose output necessary for establishing the reactive force against the engine torque is lowest.

This kind of selecting means is capable of reducing the output of the motor generator to be used as the reaction element against the engine torque, and the motor generator is thereby downsized.

In addition to the above, according to the hybrid drive unit of the invention, the power distribution device comprises a combined planetary gear mechanism, which is composed of two sets of planetary gear mechanisms, and in which four rotary elements of the planetary gear mechanisms are individually connected with each other. The rotary elements of the combined planetary gear mechanism are connected as illustrated in a nomographic diagram. In the diagram, lines representing the four rotary elements are situated in a different position on a baseline, the lines representing the first and fourth rotary elements are situated next to each other, and lines representing the second and third rotary elements are situated both outer ends.

Accordingly, in the nomographic diagram wherein the first to fourth rotary elements are situated in a different position on the baseline, the first and fourth rotary elements are situated next to each other, and the second and the third rotary elements are situated both outer ends.

The above and further objects and novel features of the invention will more fully appear from the following detailed description when the same is read with reference to the accompanying drawings. It is to be expressly understood, however, that the drawings are for purpose of illustration only and are not intended as a definition of the limits of the invention.

DETAILED DESCRIPTION OF THE PREFERRED EMBODIMENT

Figure 1:
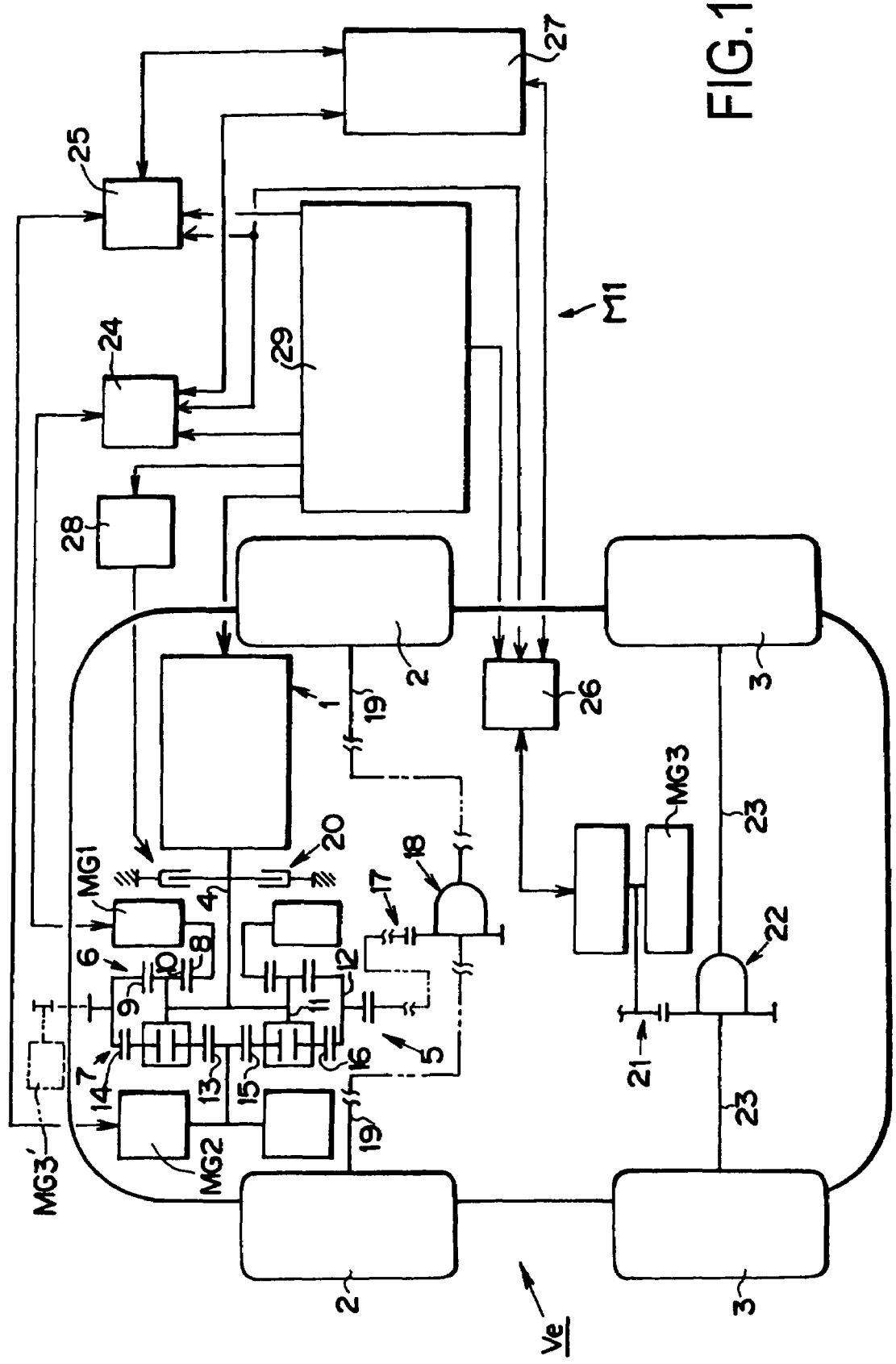
FIG. 1 is a conceptual diagram illustrating an example in which a drive train of a hybrid vehicle of the invention is applied to a four-wheel-drive vehicle.

Next, the present invention will be described with reference to accompanying drawings. First of all, one example of a drive train and a control system of a hybrid vehicle to which the invention is applied is illustrated in FIG. 1. A vehicle (i.e., a hybrid vehicle) Ve shown in FIG. 1 comprises an engine 1, a first motor generator MG1, a second motor generator MG2, and a third motor generator MG3. Specifically, the engine 1 and the second motor generator MG2 functioning as a prime mover are connected with front wheels 2 in a power transmittable manner. Also, there are provided the third motor generator MG3 as an another prime mover of the vehicle Ve. The third motor generator MG3 is connected with rear wheels 3 in a power transmittable manner.

The engine 1 is a known power unit for outputting a kinetic energy converted from a thermal energy generated by burning a fuel, which comprises a fuel injection system, an intake and exhaust system or the like. An internal combustion engine can be used as the engine 1, for example, a gasoline engine, a diesel engine, an LPG engine, a methanol engine, a hydrogen engine or the like are applicable. The intake system of the engine 1 is provided with an electronic throttle valve (an electronic throttle valve not shown). The engine 1, the first motor generator MG1, and the second motor generator MG2 are arranged coaxially, and the first motor generator MG1 is arranged between the engine 1 and the second motor generator MG2.

Here will be described a drive train from the engine 1 to the front wheel 2. An input shaft 4 and a (not shown) crankshaft of the engine 1 are connected in a power transmittable manner. In a power transmission route between the input shaft 4 and the front wheel 2, there is provided a power distribution device 5. The power distribution device 5 comprises a first planetary gear mechanism 6 and a second planetary gear mechanism 7. The first planetary gear mechanism 6 is a single pinion type planetary gear mechanism comprising three rotary elements, such as: a sun gear 8 as an external gear; a ring gear 9 as an internal gear arranged concentrically with the sun gear 8; and a carrier 11 holding a pinion gear 10 meshing with the sun gear 8 and the ring gear 9 in a revolvable manner. In the first planetary gear mechanism 6, the sun gear 8 and a rotor of the first motor generator MG1 are connected in a power transmittable manner, the carrier 11 and the input shaft 4 are connected to rotate integrally, and the ring gear 9 and a connecting drum 12 rotate integrally.

On the other hand, the second planetary gear mechanism 7 is a double pinion type planetary gear mechanism comprising three rotary elements, such as: a sun gear 13 as an external gear; a ring gear 14 as an internal gear arranged concentrically with the sun gear 13; and the carrier 11 holding a pinion gear 15 meshing with the sun gear 13, and a pinion gear 16 meshing with the ring gear 14 and the pinion gear 15 in a revolvable manner. In the second planetary gear mechanism 7, the sun gear 13 and a rotor of the second motor generator MG2 are connected in a power transmittable manner, and the ring gear 14 and the connecting drum 12 rotate integrally. Additionally, the first planetary gear mechanism 6 and the second planetary gear mechanism 7 share the carrier 11.

Moreover, a transmission mechanism 17 and a deferential 18 are arranged in a power transmission route between the connecting drum 12 and the front wheel 2, and the deferential 18 and the front wheel 2 are connected through an axle 19 in a power transmittable manner. A chain transmission mechanism, a belt transmission mechanism, a gear transmission mechanism or the like can be used as the transmission mechanism 17. In order to control rotation and cessation of the input shaft 4, there is provided a brake 20. A hydraulic brake, an electromagnetic brake or the like can be used as the brake 20. In this embodiment, a hydraulic brake is employed.

Next, here will be described the power transmission route formed between the third motor generator MG3 and the rear wheel 3. A transmission mechanism 21 and a differential 22 are connected to a rotor of the third motor generator MG3 in a power transmittable manner. For example, a gear transmission mechanism can be used as the transmission mechanism 21. A structure of the differential 22 is well known in the art, and the differential 22 and the rear wheel 3 are connected through an axle 23.

An inverter 24 is connected to the first motor generator MG1; an inverter 25 is connected to the second motor generator MG2; an inverter 26 is connected to the first motor generator MG1; and a secondary battery 27 functioning as a storing device is connected to those inverters 24, 25, and 26. A battery or a capacitor can be used as the secondary battery 27. In addition, the motor generators MG1, MG2, and MG3 have a function as a motor to convert electric energy into kinetic energy, and a function as a generator to convert kinetic energy into electric energy.

In this embodiment, the control to convert kinetic energy into electric energy and storing in the secondary battery 27 is called the "regeneration control" or the "generation control", and definitions of these parenthetic terms are substantially identical. Thus, the electric power can be transferred bi-directionally between the secondary battery 27 and the motor generators MG1, MG2 and MG3 through the inverters 24, 25 and 26. Also, the motor generators MG1, MG2 and MG3 are so wired as to transfer the electric power among them without letting through the secondary battery 27. An electric circuit M1 is constructed of these elements, such as: motor generators MG1, MG2 and MG3; the inverters 24, 25 and 26; the secondary battery 27; and electric wires.

The third motor generator MG3 may be placed at a first position illustrated by a solid line in FIG. 1, i.e., the place where the power can be transmitted between the third motor generator MG3 and the rear wheel 3. Alternatively, the third motor generator MG3' may also be placed at a second position illustrated by a broken line in FIG. 1, i.e., the place where the power can be transmitted between the third motor generator MG3' and the front wheel 2. The secondary battery 27 is connected to the third motor generator MG3 through the inverter 26 also in case of selecting the second position. The third motor generator MG3 is also connected with the transmission mechanism 17 in a power transmittable manner. Thus, the third motor generator MG3 is placed at the first position, in case the vehicle Ve is a four-wheel-drive car wherein the power is transmitted to both the front and rear wheels 2 and 3. On the other hand, in case the vehicle Ve is a two-wheel-drive car (i.e., a front engine front drive vehicle) wherein the power can be transmitted only to the front wheel 2 and cannot be transmitted to rear wheel 3, the third motor generator MG3' is placed at the second position.

Meanwhile, there is provided an actuator 28 for controlling braking force of the brake 20. In case the brake 20 is a hydraulic brake, a hydraulic control unit can be employed as the actuator 28. The hydraulic control unit comprises a hydraulic circuit and a solenoid operated valve, and it is known in the art.

Moreover, there is provided an electronic control unit 29 as a controller for controlling the vehicle Ve entirely. Signals of a vehicle speed, an acceleration demand, a braking demand, an engine speed, a charging amount of the secondary battery 27 and so on are inputted to the electronic control unit 29. From the electronic control unit 29, there are outputted: a signal to control the output (i.e., speed×torque) of the engine 1; signals to control the motor generators MG1, MG2 and MG3 through the inverters 24, 25 and 26; a signal to control the braking force of the brake 20 through the actuator 28; and so on.

Here will be described a corresponding relation between the construction of vehicle Ve illustrated in FIG. 1 and the construction of the invention. The front wheel 2 and the rear wheel 3 correspond to the wheel of the invention; the carrier 11 corresponds to the first rotary element (or the input element) of the invention; the sun gear 8 corresponds to the second rotary element of the invention; the sun gear 13 corresponds to the third rotary element of the invention; the connecting drum 12 having the ring gears 9 and 14 corresponds to the fourth rotary element (or the output element) of the invention; and the vehicle Ve corresponds to the hybrid vehicle of the invention.

In case a condition to startup the engine 1 is satisfied when the vehicle Ve stops so that the engine 1 and the motor generators MG1, MG2 and MG3 are halted, the first motor generator is supplied with electric power and driven to function as a motor. In this situation, the first motor generator MG1 is controlled to rotate in a forward direction. Here, in this embodiment, the "forward direction" means a direction identical to the direction of the autonomous rotation of the engine 1. When the first motor generator MG1 functions as a motor, the torque of MG1 is inputted to the sun gear 8 of the first planetary gear mechanism 6, and the ring gear 9 of the first planetary gear mechanism 6 functions as a reaction element. Consequently, the torque of the first motor generator MG1 is transmitted to the engine 1 through the input shaft 4 so that the cranking of the engine 1 is carried out. At the same time, a fuel injection control is carried out and fuel is combusted in the engine 1. As a result, the engine 1 starts rotating autonomously.

After the engine 1 is thus started and the engine speed is increased, the first motor generator MG1 functions as a reaction element against the engine torque by being kept at a predetermined speed. When the first motor generator MG1 functions as a reaction element, the torque to rotate the connecting drum 12 in the forward direction is raised so that the driving force to move the vehicle Ve in the forward direction is increased. Here will be described a fundamental control which is practicable for the vehicle Ve. First, a drive demand of the vehicle Ve is calculated on the basis of a vehicle speed and an opening degree of an accelerator. Then a target engine output is determined on the basis of the drive demand, and a target engine speed is calculated on the basis of the target engine output and an optimum fuel economy curve.

Moreover, a control to bring the actual engine speed approximate to the target engine speed is carried out, by controlling the speed of the reaction element against the engine torque to control the speed change ratio of the power distribution device 5 steplessly. At the same time, a control to bring the actual engine torque approximate to the target engine torque is carried out by controlling the electronic throttle valve etc. It is also possible to transmit the torque of the third motor generator MG3 to the front wheel 2 or the rear wheel 3 by operating MG3 as a motor.

In this embodiment, the second motor generator MG2 is connected with the sun gear 13 of the second planetary gear mechanism 7 of the power distribution device 5. Therefore, it is also possible to carry out a control to operate the second motor generator MG2 as a generator to establish the reactive force against the engine torque. In other words, according to this embodiment, the speed change ratio of the power distribution device 5 can be changed steplessly, by operating at least one of the motor generators MG1 and MG2 as a generator to establish reactive force against the engine torque and controlling the speed thereof Thus, in case of selecting or determining the motor generator to be operated as a generator to establish reactive force against the engine torque, there is selected a control mode in which the amount of the electric energy in the electric circuit M1 is reduced as low as possible. Here, the "control mode" means a pattern of the control. Determinant factors of the control mode are, for example: a kind of an operation mode of the motor generator establishing the reaction torque, i.e., to operate it as a "motor" or a "generator"; a destination of the electric power arising from the regeneration control of the motor generator establishing the reaction torque, i.e., the generated electric power is to be stored in the secondary battery 27, or to be fed to the third motor generator MG3 without passing through the secondary battery 27; in addition to the kind of the motor generator to be used to establish the reaction torque.

In order to select the control mode to reduce the amount of the electric energy in the electric circuit M1 as low as possible, following formulas can be used for example.

$$Te + \{(1+\rho 1)/\rho 1\}Tg - \{(1-\rho 2)/\rho 2\}Tm = 0 \quad (1)$$

$$To = (1/\rho 2)Tm - (1/\rho 1)Tg \quad (2)$$

$$(1+\rho 1)Ne = \rho 1 \cdot Ng + No \quad (3)$$

$$(1-\rho 2)Ne = -\rho 2 \cdot Nm + No \quad (4)$$

In the above formulas: "Te" represents the engine torque; "ρ1" represents a speed change ratio of the first planetary gear mechanism 6 (i.e., a value obtained by dividing the number of teeth of the sun gear 8 by the number of teeth of the ring gear 9); "Tg" represents the torque of the first motor generator MG1; "ρ2" represents a speed change ratio of the second planetary gear mechanism 7 (i.e., a value obtained by dividing the number of teeth of the sun gear 13 by the number of teeth of the ring gear 14); "Tm" represents the torque of the second motor generator MG2; "To" represents the torque transmitted to the connecting drum 12; "Ne" represents the engine speed; "Ng" represents the speed of the first motor generator MG1; "No" represents the speed of the connecting drum 12; and "Nm" represents the speed of the second motor generator MG2. Additionally, "zero" in the right-hand side of the formula (1) means that the electric power is not inputted into nor outputted from the secondary battery 27.

When the vehicle is running, Te, Ne, To, and No are calculated. On the basis of calculation result of those, outputs of the first and the second motor generators MG1 and MG2 can be calculated using the above formulas (1) to (4). On the other hand, an operating state of the third motor generator MG3 can be obtained using the formulas listed below.

$$T3 = \alpha \cdot T \quad (5)$$

$$T3 + Tg \cdot Ng + Tm \cdot Nm = 0 \quad (6)$$

In the above formulas (5) and (6), "T3" represents the torque of the third motor generator MG3, and "N3" represents the speed of the third motor generator MG3. Also, "α" represents power distribution ratio of the front wheel 2 and the rear wheel 3, more specifically, a proportion of the power transmitted to the front wheel 2. Additionally, "zero" in the right-hand side of the formula (6) means that the electric power is not inputted into nor outputted from the secondary battery 27.

Parameters used in the above formulas are obtained as described below. First of all, a vehicle speed and an opening degree of the accelerator are calculated on the basis of the signal inputted to the electronic control unit 29, and a drive demand of the vehicle Ve is calculated on the basis of the calculation result. On the basis of the drive demand, To, No, and α are calculated; and Te, and Ne are also calculated. Then, on the basis of those calculation result, Tg, Ng, Tm, Nm, T3, and N3 are calculated. The control mode can be selected on the basis of the determinant factors of the control mode including the above formulas (1) to (6).

Next, here will be sequentially described examples to select the control mode from various kinds of control modes in accordance with the running state of the vehicle Ve.

EXAMPLE 1

Example 1 will be described with reference to the flowchart in FIG. 2. First of all, it is judged (at Step S1) whether or not the amount of the electric energy in the electric circuit M1 can be reduced, in case of carrying out the control to idle the first motor generator MG1 and to operate the second motor generator MG2 as a generator to establish the reactive force against the engine torque, in accordance with the aforementioned determinant factors of the control mode, when the throttle valve is fully opened, the vehicle Ve is running at an extremely low speed after the vehicle Ve is started, and the third motor generator MG3 functions as a motor.

Figure 2:
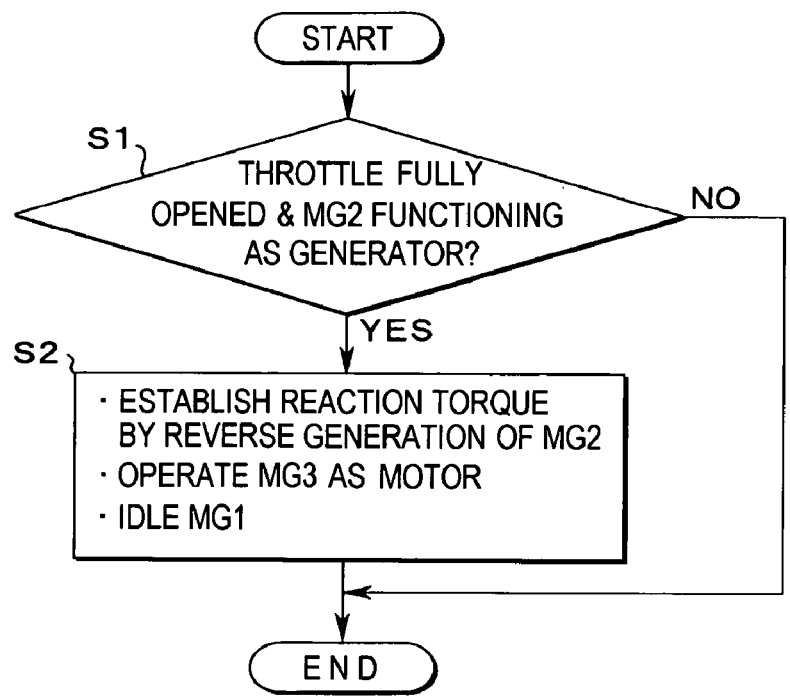
FIG. 2 is a flowchart for explaining a control example 1, which is practicable for the hybrid vehicle of the invention.

In case the answer of step S1 is YES, an operation according to the control mode selected on the basis of the aforementioned determinant factor is carried out (at step S2), and the routine shown in FIG. 2 is ended. On the contrary, in case the answer of step S2 is NO, the control routine of FIG. 2 is ended without carrying out the operation of step S2.

Figure 3:
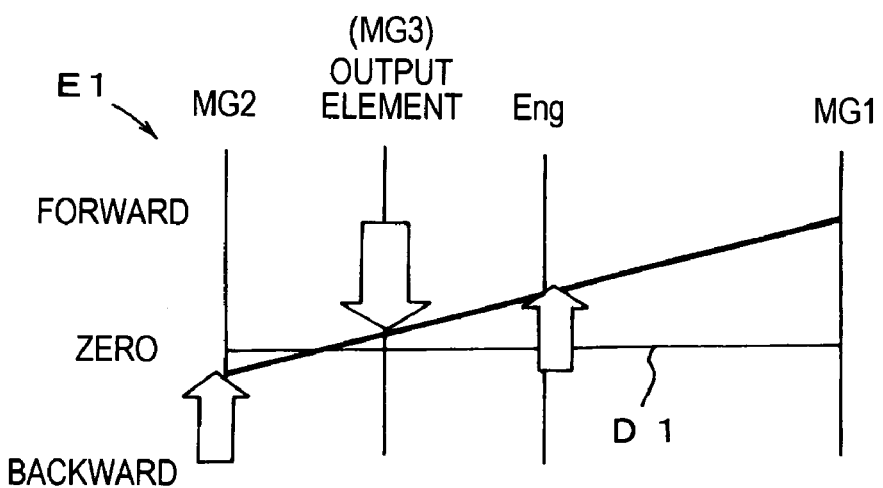
FIG. 3 is a nomographic diagram showing a status of each rotary elements in case of carrying out the control example of FIG. 2.

Here will be described the operation of step S2 with reference to a nomographic diagram E1 shown in FIG. 3. In the nomographic diagram E1 of FIG. 3, there are indicated the speed of the first motor generator MG1, the speed of the second motor generator MG2, the engine speed (Eng), and the speed of the connecting drum 12 (i.e., an output element). In other words, the nomographic diagram E1 illustrates a connection of the rotary elements of the power distribution device 5. Specifically, in the nomographic diagram E1, a line representing the engine 1 and a line representing the connecting drum 12 are situated next to each other on a baseline D1, and a line representing the sun gear 8 and the first motor generator MG1 and a line representing the sun gear 13 and the second motor generator MG2 are situated at both outer ends of D1.

In the power train illustrated in FIG. 1, a speed of the carrier 11 and the engine speed are identical to each other, and a value obtained by dividing the engine speed by the speed of the connecting drum 12 is a speed change ratio. Here, in the nomographic diagram E1 of FIG. 3: "zero" means a cessation of the rotary elements; "forward" means a forward rotation direction of the rotary element, and "backward" means a backward rotation direction of the rotary element. Also, arrows illustrated in the diagram E1 indicate directions of the torques. Additionally, in the nomographic diagram E1, "(MG3)" means that the torque of the third motor generator MG3 is transmitted to the connecting drum 12 (i.e., the front wheel 2) or to the rear wheel 3. Following examples are to be described with reference to another nomographic diagrams in addition to the nomographic diagram E1 of FIG. 3; however, expressions in those diagrams are identical to those in the nomographic diagram E1 of FIG. 3.

Firstly, a control to operate the second motor generator MG2 as a generator to establish the reactive force against the engine torque is carried out. At this stage, the second motor generator MG2 functions as a generator and rotates backward. Moreover, there is carried out a control to supplement the shortage of the engine torque as against the demand torque with the torque of the MG3, by supplying the electric power generated by the second motor generator MG2 directly to the third motor generator MG3 without letting through the secondary battery 27 so as to operate the third motor generator MG3 as a motor. In the nomographic diagram E1 of FIG. 3, the speed of the connecting drum 12 is lower than the engine speed, so that the engine torque is amplified by the power distribution device 5. Here, in case the operation of step S2 is carried out, the first motor generator MG1 idles without functioning as a motor and a generator.

Thus, in the control example shown in FIG. 2, the control to operate the second motor generator MG2 as a generator to establish the reactive force against the engine torque is carried out. Specifically, the output of the second motor generator MG2 functioning as a generator and establishing the reactive force against the engine torque is reduced as low as possible, by rotating the second motor generator MG2 in the backward direction while operating as a generator. Consequently, it is possible to prevent the second motor generator MG2 from growing in its size. Accordingly, it is possible to suppress a rise in a proportion of the power which is once converted into the electric power in the process of being transmitted from the engine 1 to the front wheel 2, and an amount of the electric energy in an electric circuit is thereby reduced. It is also possible to supply the electric power generated by the second motor generator MG2 to the third motor generator MG3, without letting through the secondary battery 27. Therefore, the amount of the electric energy in an electric circuit can be further suppressed.

Moreover, a degradation in the transmission efficiency of the power from the engine 1 to the front wheel 2 can be suppressed, and deterioration in the maximum driving force as well as in the fuel consumption of the vehicle Ve can be suppressed. Still moreover, since the electric power generated by the second motor generator MG2 is used to carry out the power-running control of the third motor generator MG3, it is possible to avoid occurring of a power circulation. In other words, "a repetition of a conversion of the motive power into the electric power, and a conversion of the converted electric power into the motive power" can be avoided. Additionally, in case the torque of the third motor generator MG3 compensate for the shortage of the engine torque in comparison with the demand torque, the torque to be compensated is prevented from increasing. Accordingly, a rating of the third motor generator MG3 is prevented from increasing. Namely, the third motor generator MG3 is prevented from increasing in its size. Consequently, production costs of a hybrid system can be suppressed.

Meanwhile, at step S1, the control mode can also be selected on the basis of a second determinant factor, which is different from the aforementioned determinant factors. This second determinant factor is that the speed change ratio ρ3 of the power distribution device 5 satisfies the following formula (7).

$$\rho 3 > 1/(1-\rho 2) \quad (7)$$

The speed change ratio ρ3 is a value obtained by dividing the speed of the carrier 11 as the input element of the power distribution device 5 by the speed of the connecting drum 12 as the output element of the power distribution device 5.

In case the answer of step S1 based on the second determinant factor is YES, when the throttle valve is fully opened while the vehicle is running at an extremely low speed, and the third motor generator MG3 is functioning as a motor, the routine advances to step S2. On the contrary, in case the answer of step S1 based on the second determinant factor is NO, the control routine of FIG. 2 is ended. Thus, the effect of the case in which the control mode is selected on the basis of the second determinant factor is identical to that of the case in which the control mode is selected on the basis of the aforementioned determinant factors.

Here, means for carrying out steps S1 and S2 shown in FIG. 2 correspond to a first hybrid control means and a fifth hybrid control means of the invention.

EXAMPLE 2

Figure 4:
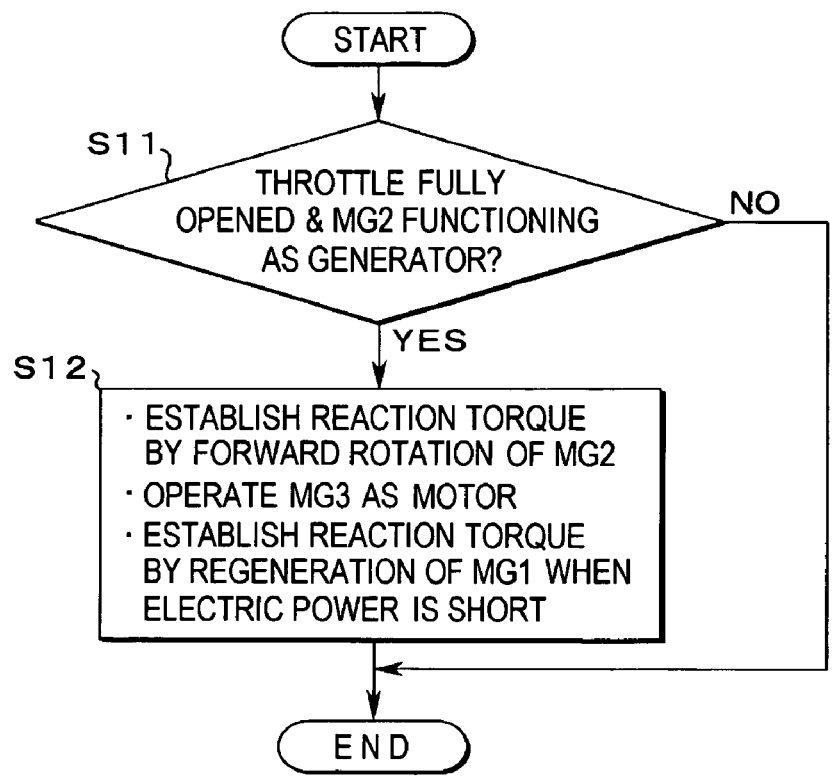
FIG. 4 is a flowchart for explaining a control example 2, which is practicable for the hybrid vehicle of the invention.

Next, an example 2, which is practicable for the vehicle Ve will be described with reference to a flowchart shown in FIG. 4. In this example, it is judged (at step S11) whether or not the amount of the electric power in the electric circuit M1 can be reduced, if carrying out a control to operate the first motor generator MG1 or both the first and second motor generators MG1 and MG2 as a generator to establish the reactive force against the engine torque, on the basis of the aforementioned determinant factors, in case the operation of step S2 in FIG. 2 is carried out, and then the rotation direction of the second motor generator MG2 is switched from backward to forward, while the throttle valve is fully opened and the vehicle Ve is running at a speed between a low speed and an intermediate speed. In case the answer of step S11 is YES, the operation of step S12 is carried out and the control routine of FIG. 4 is ended. On the contrary, in case the answer of step S11 is NO, the control routine of FIG. 4 is ended without carrying out the operation of step S12.

Figure 5:
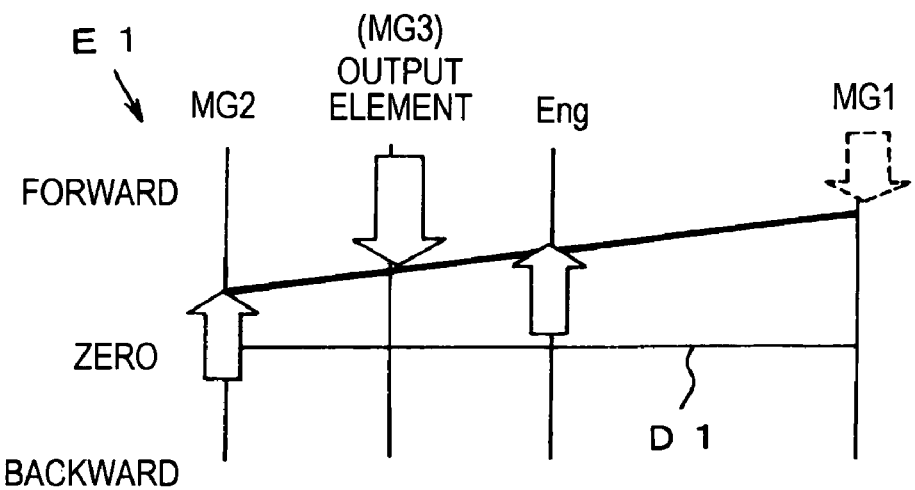
FIG. 5 is a nomographic diagram showing a status of each rotary elements in case of carrying out the control example of FIG. 4.

Here will be explained the operation of step S12 with reference to the nomographic diagram E1 shown in FIG. 5. First, the second motor generator MG2 connected with the sun gear 13 is driven in the forward direction and operated as a motor. In the nomographic diagram E1 of FIG. 5, there is illustrated a case in which the speed of the connecting drum 12 is lower than the engine speed, and the engine torque is amplified by the power distribution device 5. Also, the power-running control of the third motor generator MG3 is carried out by supplying the electric power of the secondary battery 27 to the third motor generator MG3, so as to carry out the control to supplement the shortage of the engine torque in comparison with the demand torque with the torque of the third motor generator MG3.

At step S12, moreover, if the electric power to be supplied to the second motor generator MG2 and the third motor generator MG3 can be covered by the electric power of the secondary battery 27, the first motor generator MG1 idles without functioning as a motor or generator. On the contrary, if the vehicle runs at a speed in which the electric power to be supplied to the second motor generator MG2 and the third motor generator MG3 cannot be covered by the electric power of the secondary battery 27, the first motor generator MG1 functions as a generator within a range in which the power of individual rotary elements shown in the nomographic diagram E1 of FIG. 5 are balanced, and the generated electric power is supplied to the second motor generator MG2 and the third motor generator MG3.

Thus, the same effect as that in the example 1 can also be achieved by the example 2, by selecting the control mode on the basis of the aforementioned determinant factors. Here, means for carrying out steps S11 and S12 shown in FIG. 4 correspond to the first hybrid control means and the fifth hybrid control means of the invention.

EXAMPLE 3

Figure 6:
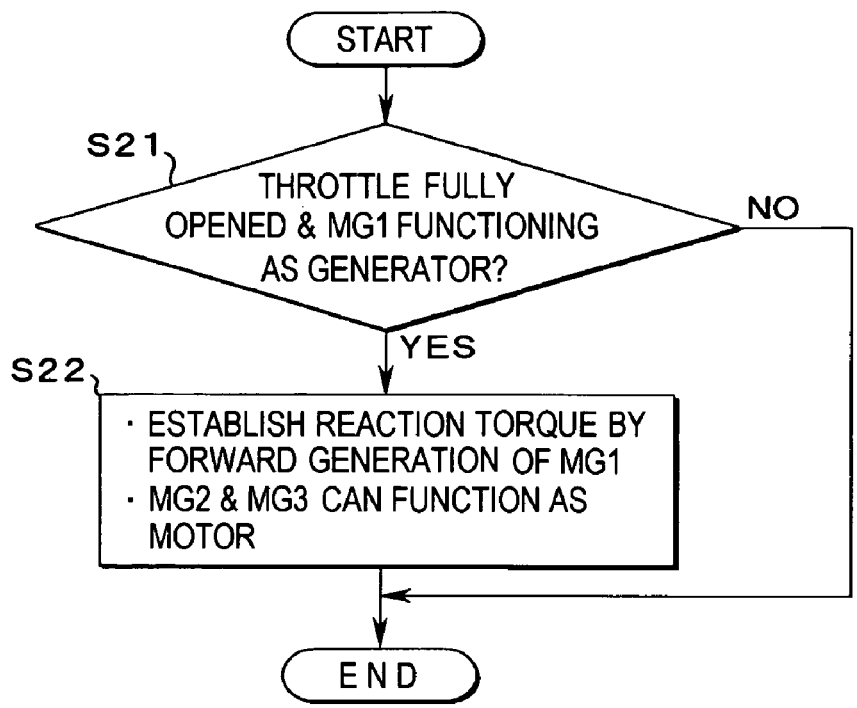
FIG. 6 is a flowchart for explaining a control example 3, which is practicable for the hybrid vehicle of the invention.

Next, an example 3 will be described with reference to a flowchart shown in FIG. 6. In this example, it is judged (at step S21) whether or not selecting the control mode to operate the first motor generator MG1 as a generator to establish the reactive force against the engine torque is optimum, in case, e.g., the throttle valve is fully opened while the vehicle Ve is running at high speed. The judgment made at step S21 is identical to the judgment made at step S1. In case the answer of step S21 is YES, an operation of step S22 is carried out and a control routine shown in FIG. 6 is ended. On the contrary, in case the answer of step S21 is NO, the control routine of FIG. 6 is ended without carrying out the operation of step S22.

Figure 7:
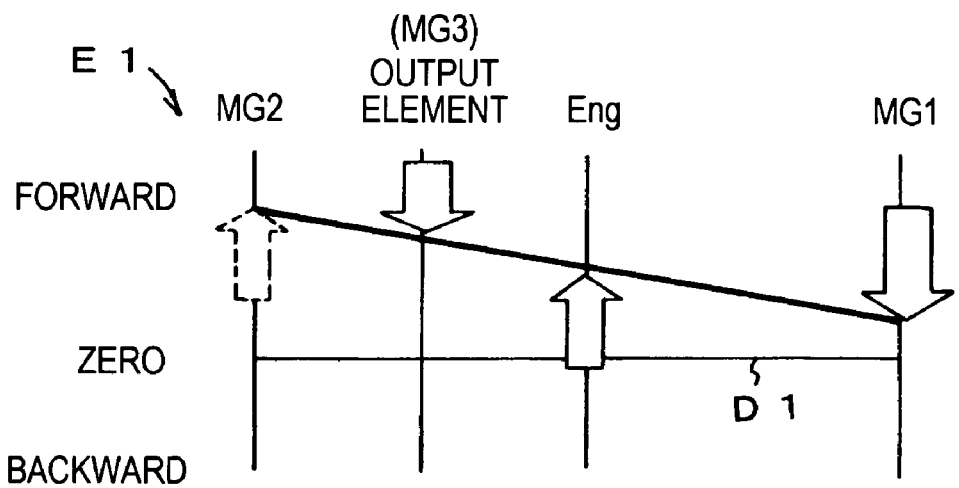
FIG. 7 is a nomographic diagram showing a status of each rotary elements in case of carrying out the control example of FIG. 6.

Here will be described the operation of step S22 with reference to the nomographic diagram E1 shown in FIG. 7. First, the control to operate the first motor generator MG1 as a generator to establish the reactive force against the engine torque is carried out. In this situation, the first motor generator MG1 rotates in the forward direction and functions as a generator. The generated electric power is stored into the secondary battery 27. In the nomographic diagram E1 of FIG. 7, the speed of the connecting drum 12 is higher than the engine speed, and the engine torque is reduced by the power distribution device 5.

At step S22, the electric power of the secondary battery 27 is supplied to the second motor generator MG2 so that MG2 functions as a motor, therefore, it is also possible to supplement the shortage of the engine torque as against the demand torque with the torque of the second motor generator MG2. Moreover, the shortage of the engine torque in comparison with the demand torque can also be supplemented with the torque of the third motor generator MG3, by supplying the electric power of the secondary battery 27 to carry out the power-running control of the third motor generator MG3. In other words, at step S22, it is possible to operate at least one of the second motor generator MG2 and the third motor generator MG3 as a motor.

Thus, the same effect as that in the example 1 can also be achieved by the example 3, by selecting the control mode on the basis of the determinant factors. Here, means for carrying out steps S21 and S22 shown in FIG. 6 correspond to a second hybrid control means and the fifth hybrid control means of the invention.

EXAMPLE 4

Figure 8:
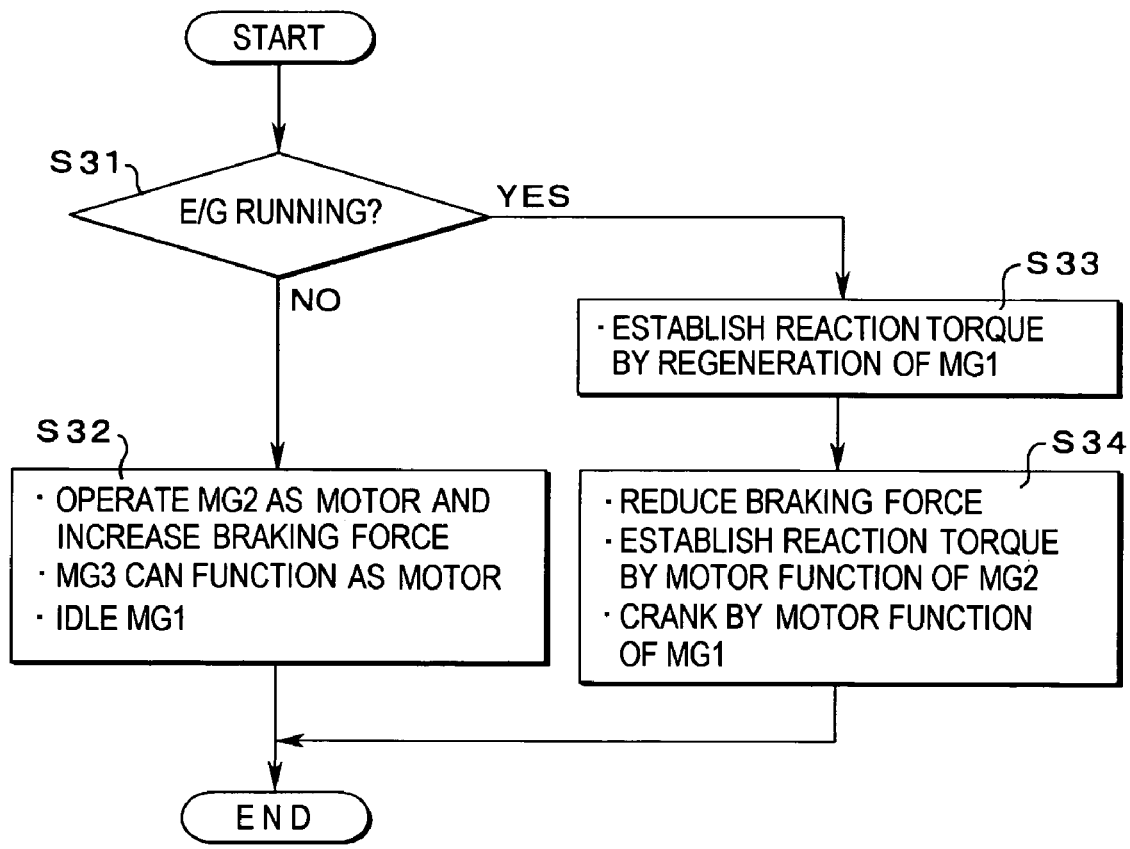
FIG. 8 is a flowchart for explaining a control example 4, which is practicable for the hybrid vehicle of the invention.
Figure 9:
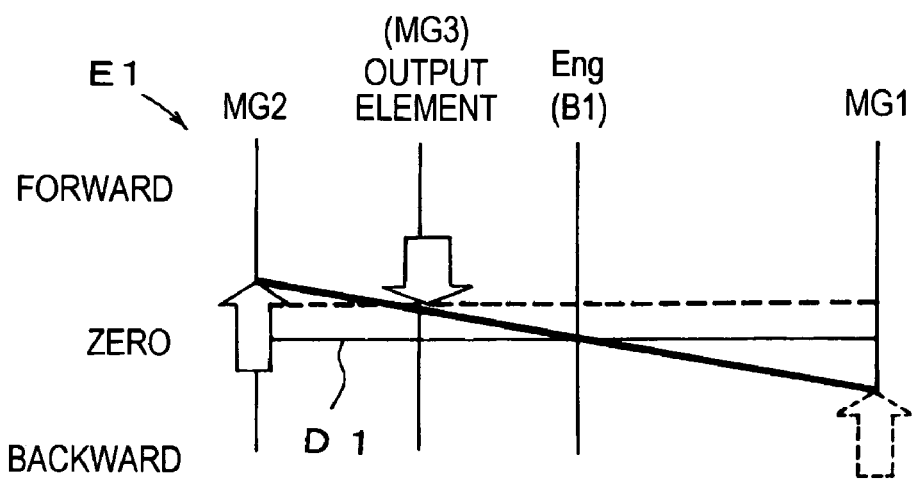
FIG. 9 is a nomographic diagram showing a status of each rotary elements in case of carrying out the control example of FIG. 8.

Next, an example 4 will be described with reference to the flowchart shown in FIG. 8, and the nomographic diagram E1 shown in FIG. 9. Firstly, it is judged (at step S31) whether or not a condition to run the vehicle Ve and to drive the engine 1 is satisfied. For example, in case an electric vehicle mode is selected so that the answer of step S31 is NO, an operation of step S32 is carried out and the control routine of FIG. 8 is ended. At this step S32, the braking force of the brake (B1) 20 is increased to halt the engine 1 so that the carrier 11 functions as the reaction element, and the power-running control of the second motor generator MG2 is carried out. As a result, the torque the second motor generator MG2 is transmitted to the connecting drum 12. At step S32, it is also possible to cover a part of the required torque of the vehicle Ve by the third motor generator MG3, by carrying out the power-running control of the third motor generator MG3. Here, at step S32, the first motor generator MG1 rotates backward and idles, as shown in FIG. 9.

On the contrary, in the situation where the answer of step S31 is YES after the execution of step S32, there is carried out (at step S33) a preparation for switching the reaction element against the second motor generator MG2 from the brake 20 to the first motor generator MG1, by operating the first motor generator MG1 as a generator. Subsequent to step S33, an operation of step S34 is carried out, and the routine of FIG. 8 is ended.

At step S34, first of all, a control to reduce the braking force of the brake 20 is carried out at an instant when the reaction torque generated by the first motor generator MG1 becomes a required value. Then, the second motor generator MG2 is operated as a motor to function as a reaction element, and a cranking of the engine 1 is commenced by controlling the speed of the first motor generator MG1 while injecting and burning the fuel. As a result, the engine is allowed to rotate autonomously. The first motor generator MG1 starts functioning as a motor at an instant when the rotation direction of the first motor generator MG1 switches from the forward to the backward in the course of such starting control of the engine 1. Consequently, the speed of the first motor generator MG1 is increased. Additionally, in order to keep the speed of the connecting drum 12 generally constant during the operation of step S34, as illustrated by a broken line in the nomographic diagram E1 of FIG. 9, an operation to lower the speed of the second motor generator MG2 is carried out. Thus, in the example 4, the electric power generated by the first motor generator MG1 functioning as a motor can be consumed by the second motor generator MG2 and the third motor generator MG3. Therefore, it is possible to avoid occurring of the power circulation.

Provided that the hybrid vehicle is a two-wheel-drive vehicle comprising the engine and the first to the third motor generators, in which the torque of the third motor generator MG3 is transmitted only to the front wheel 2, not to the rear wheel 3, and in case of carrying out the control of the example 4, a control to increase the braking force of the brake 20, to operate the third motor generator MG3 as a motor, and to idle the first and second motor generators, is carried out at step S32 in the flowchart of FIG. 8.

Here, means for carrying out the controls of steps S31 and S32 shown in FIG. 8 corresponds to a third hybrid control means of the invention. Also, means for carrying out the controls of steps S31, S33 and S34 shown in FIG. 8 corresponds to a fourth hybrid control means of the invention.

EXAMPLE 5

Next, here will be described a still another control example with reference to a flowchart shown in FIG. 10, and to the nomographic diagram E1 shown in FIG. 11. First, it is judged (at step S41) whether or not a deceleration larger than a preset value is required while the vehicle is coasting. In case the answer of step S41 is YES, the speed of the connecting drum 12 is reduced as illustrated by a broken line in FIG. 11 (at step S42), by operating the first motor generator MG1 as a motor in the forward direction, and by operating the second motor generator MG2 as a generator in the forward direction. At this step S42, moreover, the power corresponding to the kinetic energy of the vehicle Ve is transmitted to the engine 1 through the power distribution device 5, therefore, an engine brake is generated as illustrated in FIG. 11 by arrows of broken line. This accelerates the reduction in the speed of the connecting drum 12.

Subsequent to aforementioned step S42, it is judged (at step S43) whether or not the vehicle is in a low speed range where the engine 1 is allowed to be halted, and the required deceleration is a preset value or smaller. On the assumption that the engine 1 is halted, if the speed difference between the carrier 11 connected with the engine 1 and the connecting drum 12 is a preset value or larger, namely, the vehicle speed is higher than the preset value, a seizing of a bearing of the carrier 11 may occur, i.e., a seizing of a bearing supporting the pinion gears 10, 15 and 16 may occur. For this reason, the engine 1 is allowed to be halted in case the speed difference between the carrier 11 and the connecting drum 12 is the preset value or smaller, namely, in the low speed range where the seizing of the bearing may not occur.

Figure 10:
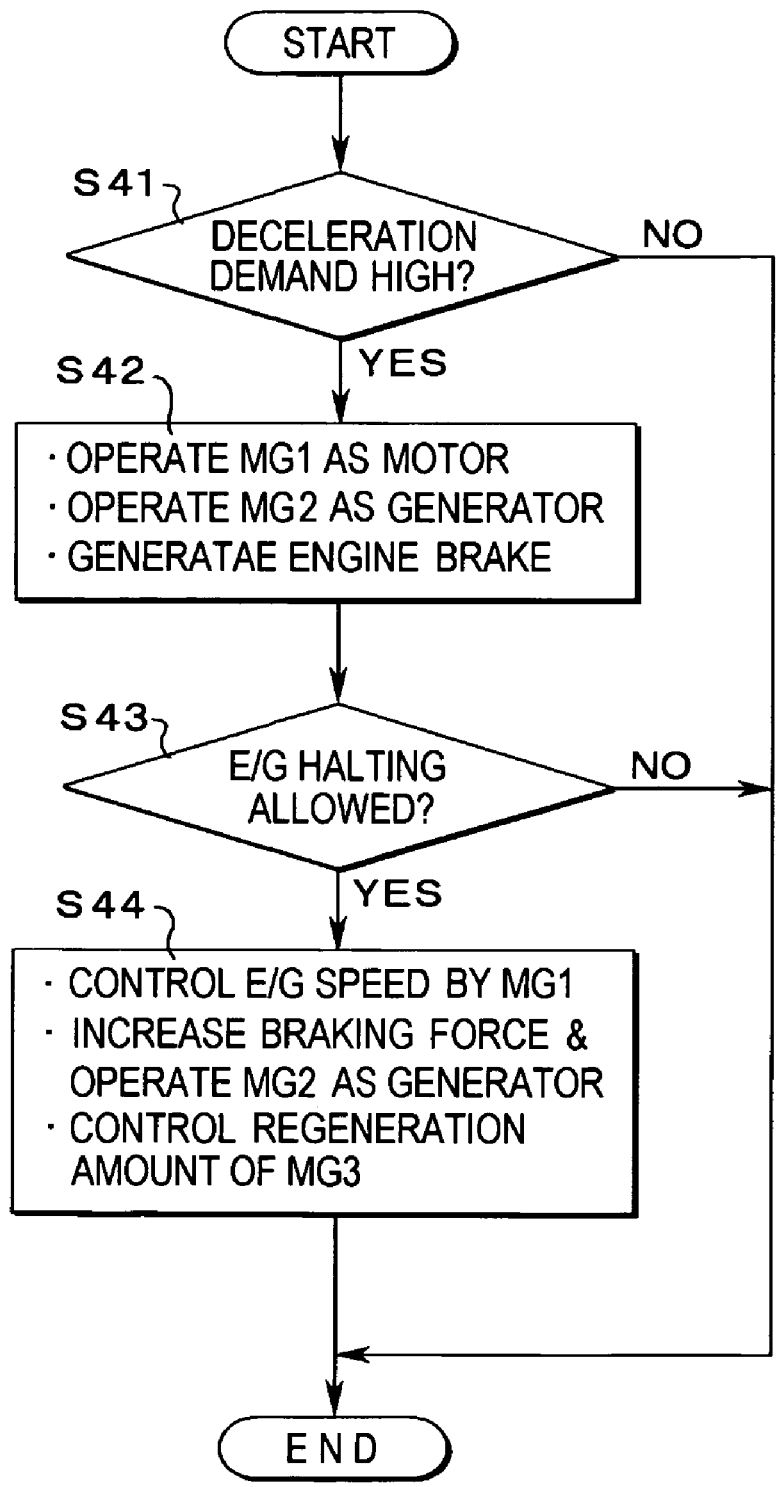
FIG. 10 is a flowchart for explaining a control example 5, which is practicable for the hybrid vehicle of the invention.
Figure 11:
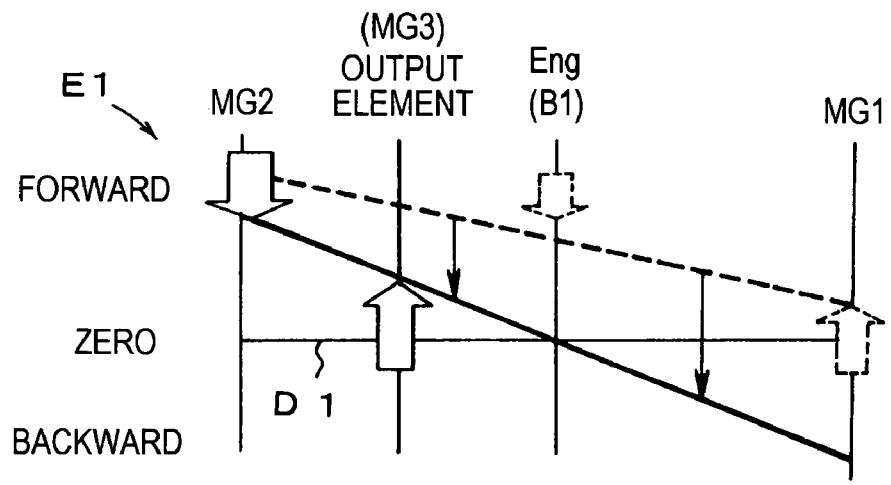
FIG. 11 is a nomographic diagram showing a status of each rotary elements in case of carrying out the control example of FIG. 10.

In case the answer of step S43 is YES, the speed of the first motor generator MG1 is controlled and the braking force of the brake 20 is increased (at step S44), in order to make the engine speed zero as illustrated by a solid line in FIG. 11, then, the control routine of FIG. 10 is ended. At step S44, the first motor generator MG1 functions as a generator when it rotates in the forward direction, and functions as a motor when it rotates in the reverse direction. The second motor generator MG2 keeps functioning as a generator also at step S44.

At steps S42 and S44, moreover, the third motor generator MG3 functions as a motor. At this stage, a regeneration amount of the third motor generator MG3 is set to conform the actual braking force to the demand deceleration, and to optimize the fuel consumption of the engine 1, on the basis of parameters such as a positioning of the third motor generator MG3, a capacity of the secondary battery 27 and so on. In case the answer of step S41 or S43 is NO, the control routine of FIG. 10 is ended.

EXAMPLE 6

Next, here will be described an example 6. This example 6 is carried out in case the throttle valve is not fully opened, in other words, the vehicle is in a normal running condition. A procedure of the example 6 is identical to that shown in the flowchart of FIG. 2. Therefore, the operating state of the example 6 can be illustrated by the nomographic diagram E1 of FIG. 3. Here, the example 6 can be explained by the flowchart of FIG. 2, wherein the description of step S1 "the throttle valve is fully opened" is replaced by "the throttle valve is not fully opened". The same effects as that in the example 1 can also be achieved by the example 6.

EXAMPLE 7

Figure 12:
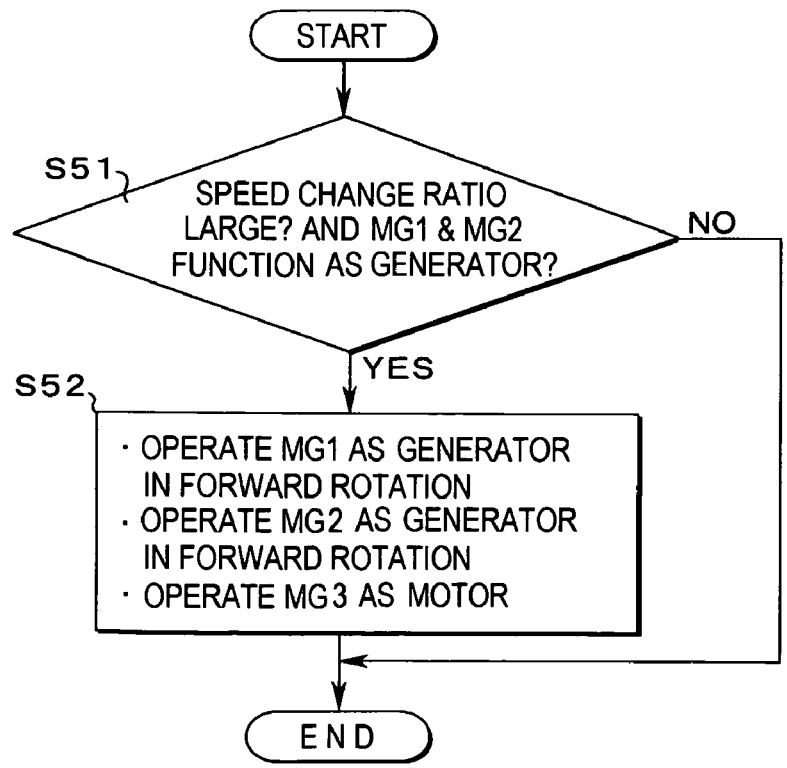
FIG. 12 is a flowchart for explaining a control example 7, which is practicable for the hybrid vehicle of the invention.
Figure 13:
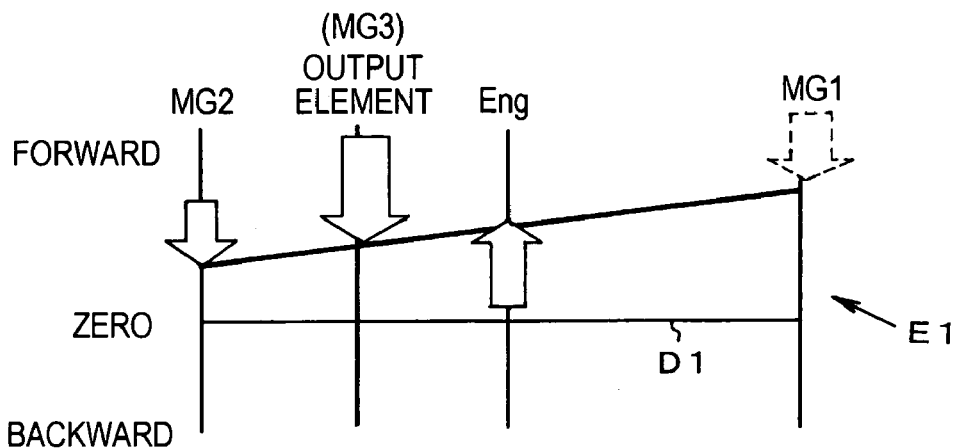
FIG. 13 is a nomographic diagram showing a status of each rotary elements in case of carrying out the control example of FIG. 12.

Next, here will be described an example 7 with reference to a flowchart shown in FIG. 12, and to the nomographic diagram E1 shown in FIG. 13. First, it is judged (at step S51) whether or not selecting the control mode to operate the first motor generator MG1 and the second motor generator MG2 as a generator to establish the reactive force against the engine torque is optimum on the basis of the aforementioned determinant factors, in case the throttle valve is not fully opened and the speed of the connecting drum 12 is lower than the engine speed. In case the answer of step S51 is YES, an operation of step S52 is carried out, and the control routine of FIG. 12 is ended. On the contrary, in case the answer of step S51 is NO, the control routine of FIG. 12 is ended without carrying out the operation of step S52.

Here will be described the operation of step S52 with reference to the nomographic diagram E1 shown in FIG. 13. As illustrated in the nomographic diagram E1 of FIG. 13, the first motor generator MG1 and the second motor generator MG2 are driven in the forward direction and operated as generators to establish the reactive force against the engine torque. The electric powers generated by the first motor generator MG1 and the second motor generator MG2 are supplied to the third motor generator MG3 without passing through the secondary battery 27 so that the third motor generator MG3 functions as a motor. Namely, the vehicle Ve runs without using the electric power of the secondary battery 27 as much as possible. The same effects as that in the example 1 can also be achieved by the example 7.

Here, means for carrying out the controls of steps S51 and S52 shown in the flowchart of FIG. 12 correspond to the first hybrid control means and the fifth hybrid control means of the invention.

EXAMPLE 8

Figure 14:
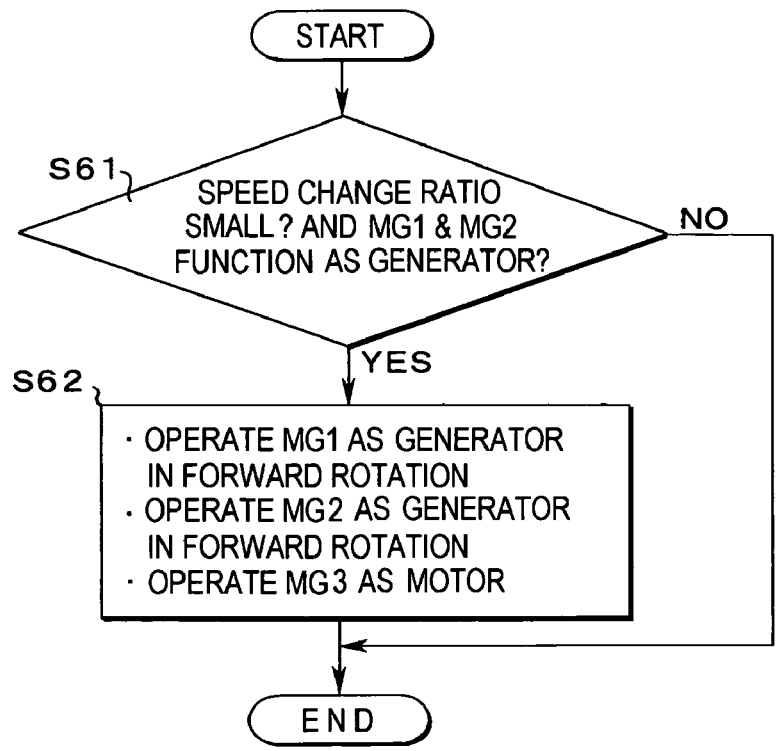
FIG. 14 is a flowchart for explaining a control example 8, which is practicable for the hybrid vehicle of the invention.
Figure 15:
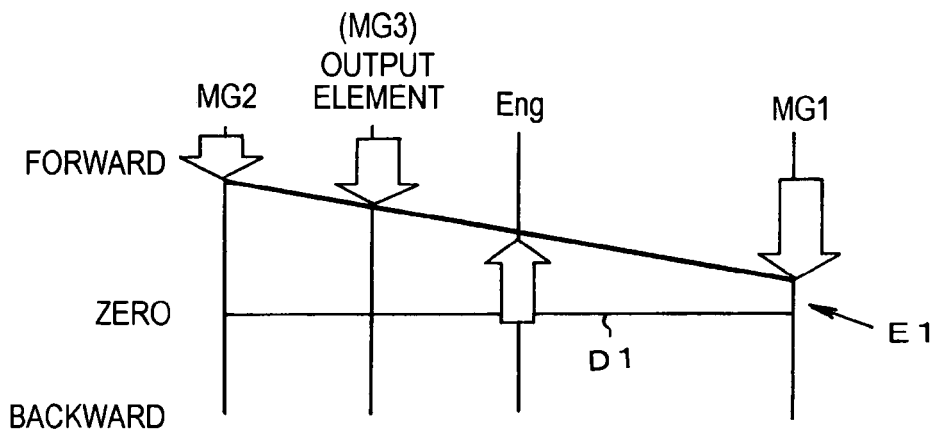
FIG. 15 is a nomographic diagram showing a status of each rotary elements in case of carrying out the control example of FIG. 14.

Next, here will be described an example 8 with reference to a flowchart shown in FIG. 14, and to the nomographic diagram E1 shown in FIG. 15. First, it is judged (at step S61) whether or not selecting the control mode to operate the first motor generator MG1 and the second motor generator MG2 as generators to establish the reactive force against the output torque of the engine 1 is optimum, in case the throttle valve is not fully opened and the speed of the connecting drum 12 is higher than the engine speed. In case the answer of step S61 is YES, an operation of step S62 is carried out in accordance with the control mode selected at step S61, and the control routine of FIG. 14 is ended. On the contrary, in case the answer of step S61 is NO, the control routine of FIG. 14 is ended without carrying out the operation of step S62.

Here will be described the operation of step S62 with reference to the nomographic diagram E1 of FIG. 15. As shown in the nomographic diagram E1 of FIG. 15, the first motor generator MG1 and the second motor generator MG2 are driven in the forward direction and operated as generators to establish the reactive force against the engine torque. The electric powers generated by the first motor generator MG1 and the second motor generator MG2 are supplied to the third motor generator MG3 without passing through the secondary battery 27 so that the third motor generator MG3 functions as a motor. Namely, the vehicle Ve runs without using the electric power of the secondary battery 27 as much as possible. The same effects as that in the example 1 can also be attained by the example 8.

Here, means for carrying out the controls of steps S61 and S62 shown in the flowchart of FIG. 14 correspond to the first hybrid control means and the fifth hybrid control means of the invention.

Here will be synthetically described the actions and effects which can be achieved commonly in each example. According to the examples 1 to 3, although three motor generators, i.e. the first motor generator MG1 to the third motor generators MG3 are used, there in no increase in a total sum of the electric energy generated by power of the engine 1, and the electric power stored into the second battery 27 or the electric energy flowing through the second battery 27. Therefore, it is possible to reduce the maximum output of each motor generator, thereby suppressing the increase in the cost of the first motor generator MG1, the second motor generator MG2, and the invertors 24 and 25. In particular, the above-mentioned effects can be obtained by comparing individual examples with a first comparative example. Here, the first comparative example is "a construction comprising: a power distribution device having three rotary elements, which is connected with a front or a rear wheel; wherein a first and second motor generators are connected with the power distribution device; and wherein a third motor generator is not provided".

According to the examples 1 to 3, moreover, the amount of in the electric circuit M1 the electric power can be reduced when the throttle valve is fully opened and the vehicle Ve is running at a low speed. In addition, the power transmission efficiency between the engine 1 and the front wheel 2 is improved, and the maximum driving force and the fuel consumption are thereby improved. According to the examples 1 to 3, still moreover, the third motor generator MG3 can function as a motor nevertheless the maximum output of each motor generator can be reduced. For this reason, the output of the second battery 27 at a low vehicle speed can be utilized effectively. In particular, the above-mentioned effects can be obtained by comparing the second comparative example with each example. Here, the second comparative example is "a construction, wherein a third motor generator is connected in a power transmittable manner with a wheel to which a power distribution device is not connected, in addition to the construction of the first comparative example (i.e., a four-wheel vehicle)". According to the examples 1 to 3, furthermore, an increase in the maximum output of each motor generator can be suppressed without impairing the function of the power distribution device 5 as the continuously variable transmission.

Moreover, as shown in the example 4, in case the running mode in which the second motor generator MG2 and the third motor generator MG3 function as the motors, i.e. the electric vehicle mode is selected, or in case the motor generator MG1 functions as a generator, it is possible to avoid the power circulation such that the conversion between the kinetic energy and the electric energy is repeated. Therefore, the power transmission efficiency between the engine 1 and the front wheel 2 is improved.

According to the examples 4 and 5, moreover, the engine speed and the torque to be borne by the brake 20 can be controlled accurately by controlling the torque and the speed of the first motor generator MG1. Therefore, structurally simple element, such as a synchronously meshing type brake may be used as the brake 20. For this reason, as compared to the case of using e.g., a multi-plate type brake, the torque capacity can be controlled certainly. Particularly, "zero-torque capacity" can be achieved certainly. As a result, a brake and drag torque of the brake 20 can be reduced.

Figure 16:
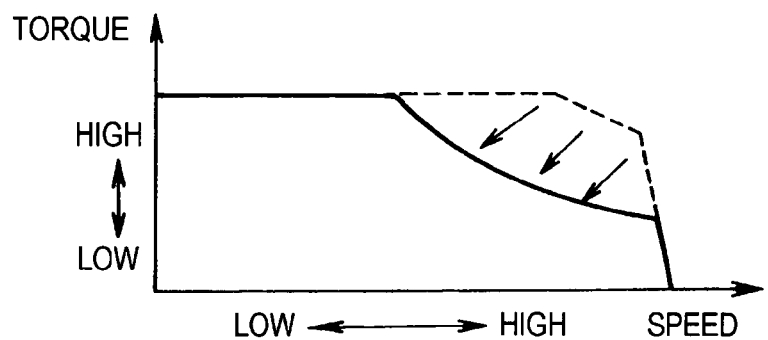
FIG. 16 is a diagram showing output characteristics of the first motor generator in each control example and comparative example.

FIG. 16 is a diagram showing output characteristics of the first motor generator MG1 in each example. In FIG. 16, an abscissa axis represents speed of the motor generator, and an ordinate axis represents the torque of the motor generator. In case of establishing the reactive torque against the engine torque only by the first motor generator MG1 (i.e., the first comparative example), the torque stays constant regardless of the speed of the motor generator, as illustrated by the broken line. On the other hand, according to this embodiment, the motor generator to be operated as a generator to establish the reactive force is selectively interchangeable. Therefore, the torque in the high-speed range can be lowered in comparison with that in the low-speed range, as illustrated by the solid line. Thus, according to the examples, the maximum output of the first motor generator MG1 can be reduced.

Figure 17:
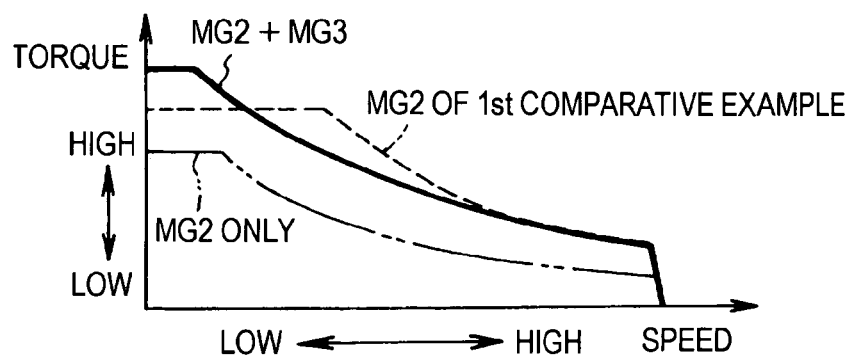
FIG. 17 is a diagram showing output characteristics of the motor generators in each control example and comparative example.

FIG. 17 is a diagram showing output characteristics of the second motor generator MG2 and the third motor generator MG3 in the examples. In FIG. 17, an abscissa axis represents speed of the motor generators; an ordinate axis represents the torque of the motor generators; a solid line represents the total sum of outputs of the second motor generator MG2 and the third motor generator MG3 in this example; a dashed line represents the characteristics of second motor generator MG2 based on the assumption that the third motor generator MG3 is provided; and the broken line represents output characteristics of the second motor generator MG2 in the first comparative example. As shown in FIG. 17, the torque of the second motor generator based on the assumption that the third motor generator MG3 is provided, is lower than the torque of the second motor generator in the first comparative example, throughout the speed range. That is, the maximum output of the second motor generator in the example is lower than that in the first comparative example.

Figure 18:
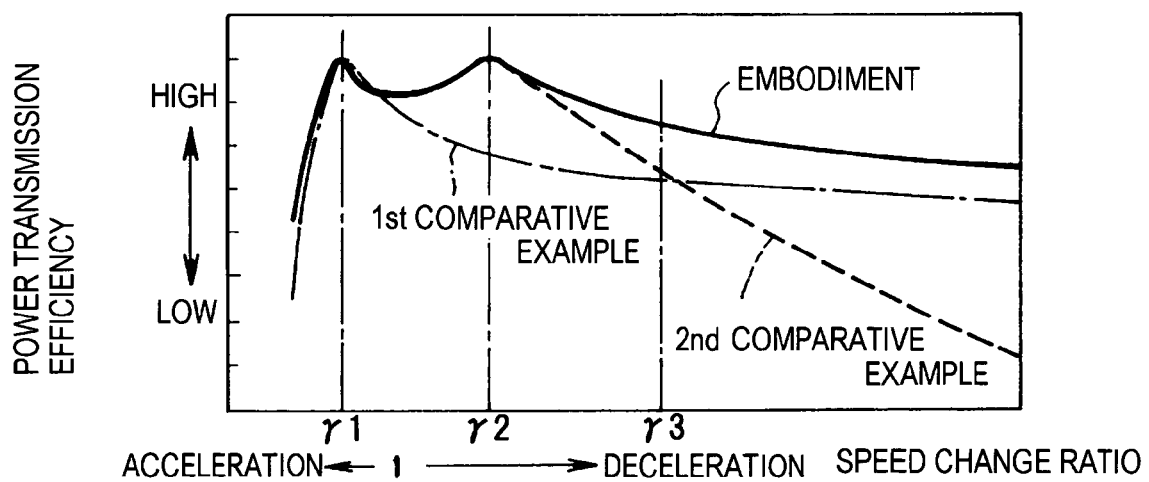
FIG. 18 is a diagram showing one example of a relation between a speed change ratio and a power transmission efficiency of a power distribution device in each control example and comparative example.

FIG. 18 is a diagram showing one example of a relation between a speed change ratio of the input and the output elements of the power distribution device, and a transmission efficiency of the power transmitted from the engine to the wheels. In FIG. 18, a solid line represents characteristics corresponding to this example; a dashed line represents characteristics corresponding to the first comparative example; and a broken line represents the second comparative example. In case the speed change ratio is smaller than a preset value γ1 which is smaller than "1", the power transmission efficiencies of the example, as well as the first and the second comparative examples go up.

In FIG. 18, the power transmission efficiencies of the examples and the second comparative example tend to lower as the speed change ratio increases from the preset value γ1 to "1", and tend to rise again as the speed change ratio is "1" or larger. In case the speed change ratio is the predetermined value γ2 or larger, both the power transmission efficiencies of the examples and the second comparative example tend to lower. The lowering degree of the power transmission efficiency (i.e., the lowering gradient) according to the increasing degree of the speed change ratio of the examples is gentler than that of the second comparative example.

On the other hand, according to the first comparative example, in case the speed change ratio is the preset value γ1 or larger, the power transmission efficiency thereof tends to lower in accordance with a rise in the speed change ratio. In case the speed change ratio is the preset value γ3 or more, the power transmission efficiency of the first comparative example is higher than that of the second comparative example. In the range where the speed change ratio is smaller than the preset value γ3, the power transmission efficiency of the second comparative example is higher than that of the first comparative example. In case the speed change ratio is the preset value γ2 or larger, the power transmission efficiency of the example is higher than that of the first and the second comparative examples.

This is because, according to the examples, the reactive force against the engine torque can be established by one of the first motor generator MG1 or the second motor generator MG2, the output of which is lower than that of the other one, and because the power circulation can be avoided by supplying the electric power generated by the motor generator establishing the reactive force to the third motor generator MG3, in case the speed change ratio of the second planetary gear mechanism 7 is γ2 or larger. According to the examples, moreover, the reactive force against the engine torque is established by one of the first motor generator MG1 and the second motor generator MG2, therefore, the other motor generator can be used as a fail safe in case the function of one of the motor generators decreases.

Although not shown, the controls according to the examples are practicable also in a two-wheel drive vehicle (FR) comprising a drive train wherein an engine, the first motor generator and the second motor generator are connected with the rotary elements of the power distribution device connected to rear wheels, and wherein a third motor generator is connected also with the rear wheels.

Moreover, although not shown, the controls according to the examples are also practicable in a four-wheel drive vehicle comprising a drive train wherein the engine, the first motor generator and the second motor generator are connected with the rotary elements of the power distribution device connected with the rear wheels, and wherein the third motor generator is connected with the front wheels. Furthermore, the control according to the examples are applicable also in the (not shown) four-wheel drive vehicle comprising a transfer for distributing the power transmitted to the transmission mechanism 17 to the front and rear wheels. In addition, a plurality of examples can be carried out in combination.

What is claimed is:

1. A hybrid drive unit for vehicles, in which an engine, a first motor generator, and a wheel are connected to a power distribution device constructed of a first planetary gear mechanism and a second planetary gear mechanism and having a plurality of rotary elements capable of rotating differentially with each other, and which is capable of steplessly controlling a speed change ratio as a speed ratio of the rotary element connected to the engine and the rotary element connected to the wheel by controlling the first motor generator or a second motor generator, wherein:

the power distribution device comprises a first rotary element functions as an input element, a second rotary element capable of functioning as a reaction element, a third rotary element capable of functioning as an another reaction element, and a fourth rotary element functions as an output element;

the engine is connected to the first rotary element, the first motor generator is connected to the second rotary element, the second motor generator is connected to the third rotary element, and the wheel is connected to the fourth rotary element; and comprising:

a third motor generator connected to any of said wheel;

an electric circuit for allowing exchange of electric power among individual motor generators; and an electronic control unit for carrying out a control to establish a reactive force against the engine torque by one of the first motor generator and the second motor generator the output of which is lower than that of the other one, and for carrying out a control to supply an electric power generated by the motor generator establishing the reactive force to the third motor generator in case the speed change ratio between the input element and the output element of the power distribution device is set larger than the larger speed change ratio out of the two speed change ratios which correspond to speed change ratios at inflection points where a transmission efficiency of the power transmitted from the engine to the wheel changes from increasing to decreasing.

2. A hybrid drive unit for vehicles, in which an engine, a first motor generator, and a wheel are connected to a power distribution device having a plurality of rotary elements capable of rotating differentially with each other, and which is capable of steplessly controlling a speed change ratio as a speed ratio of the rotary element connected to the engine and the rotary element connected to the wheel, wherein:

the power distribution device comprises a first rotary element functions as an input element, a second rotary element capable of functioning as a reaction element, a third rotary element capable of functioning as an another reaction element, and a fourth rotary element functions as an output element;

the engine is connected to the first rotary element, the first motor generator is connected to the second rotary element, and the wheel is connected to the fourth rotary element; and comprising:

a second motor generator connected to the third rotary element;

a third motor generator connected to any of said wheel and an another wheel;

an electric circuit for allowing exchange of electric power among individual motor generators; and a first hybrid control means for transmitting engine torque to the fourth rotary element by operating the second motor generator as a motor or a generator to establish reactive force against the engine torque, while transmitting a torque of the third motor generator to the wheel or the another wheel by operating the third motor generator as a motor, in case of controlling the speed of the fourth rotary element lower than that of the first rotary element while transmitting the engine torque to the first rotary element.

3. The hybrid drive unit for vehicles according to claim 2, wherein:

the first hybrid control means includes a determining means for determining an amount of the electric power in the electric circuit, in case the second motor generator functions as a motor or a generator to establish the reactive force against the engine torque; and the second motor generator functions as a motor or a generator in case the amount of the electric power in the electric circuit is determined to be reduced.

4. The hybrid drive unit for vehicles according to claim 3, wherein:

the determining means includes a means for determining the amount of the electric power in the electric circuit, in case the second motor generator functions as a motor or a generator to establish the reactive force against the engine torque when the engine output is maximum.

5. The hybrid drive unit for vehicles according to claim 2, wherein:

the first hybrid control means includes a means for operating the third motor generator as a motor by supplying the electric power generated by the second motor generator to the third motor generator, in case the second motor generator functions as a generator.

6. A hybrid drive unit for vehicles, in which an engine, a first motor generator, and a wheel are connected to a power distribution device having a plurality of rotary elements capable of rotating differentially with each other, and which is capable of steplessly controlling a speed change ratio as a speed ratio of the rotary element connected to the engine and the rotary element connected to the wheel, wherein:

the power distribution device comprises a first rotary element functions as an input element, a second rotary element capable of functioning as a reaction element, a third rotary element capable of functioning as an another reaction element, and a fourth rotary element functions as an output element;

the engine is connected to the first rotary element, the first motor generator is connected to the second rotary element, and the wheel is connected to the fourth rotary element; and comprising:

a second motor generator connected to the third rotary element;

a third motor generator connected to any of said wheel and an another wheel;

an electric circuit for allowing exchange of electric power among individual motor generators; and a hybrid control means for transmitting at least one of the torque of the second and third motor generators to the wheel or the another wheel, by operating the first motor generator as a generator to establish the reactive force against the engine torque, and by operating at least one of the second and third motor generators as a motor, in case of controlling the speed of the fourth rotary element higher than that of the first rotary element while transmitting the engine torque to the first rotary element.

7. The hybrid drive unit for vehicles according to claim 6, wherein:

the hybrid control means includes a determining means for determining the amount of the electric power in the electric circuit, in case the first motor generator functions as a motor or a generator to establish the reactive force against the engine torque; and the first motor generator functions as a motor or a generator, in case the amount of the electric power in the electric circuit is determined to be reduced.

8. The hybrid drive unit for vehicles according to claim 7, wherein:

the determining means includes a means for determining the amount of the electric power in the electric circuit, in case the first motor generator functions as a motor or a generator to establish the reactive force against the engine torque when the engine output is maximum.

9. The hybrid drive unit for vehicles according to claim 6, wherein:

the hybrid control means includes a means for operating at least one of the second and third motor generators as a motor by supplying the electric power generated by the first motor generator to at least one of the second and third motor generators, in case the first motor generator functions as a generator.

10. A hybrid drive unit for vehicles, in which an engine, a first motor generator, and a wheel are connected to a power distribution device having a plurality of rotary elements capable of rotating differentially with each other, and which is capable of steplessly controlling a speed change ratio as a speed ratio of the rotary element connected to the engine and the rotary element connected to the wheel, wherein:

the power distribution device comprises a first rotary element functions as an input element, a second rotary element capable of functioning as a reaction element, a third rotary element capable of functioning as an another reaction element, and a fourth rotary element functions as an output element;

the engine is connected to the first rotary element, the first motor generator is connected to the second rotary element, and the wheel is connected to the fourth rotary element; and comprising:

a second motor generator connected to the third rotary element;

a third motor generator connected to any of said wheel and an another wheel; and an electric circuit for allowing exchange of electric power among individual motor generators, further comprising:

a brake for selectively halting revolutions of the first rotary element and the engine; and a hybrid control means for allowing the brake to function as a reaction element against at least one of the second and third motor generators, by using the brake to halt the revolutions of the first rotary element and the engine, in case at least one of the second and third motor generators functions as a motor and the torque thereof is transmitted to the wheel.

11. The hybrid drive unit for vehicles according to claim 10, further comprising:

a second hybrid control means for rotating the engine autonomously, by allowing the first motor generator to function as a reaction element against at least one of the second and third motor generators, by operating the first motor generator as a generator, and by reducing the braking force of the brake gradually, by increasing the speed of the engine by controlling the speed of the first motor generator, and by burning fuel, in case of starting the engine when the first rotary member and the engine are halted by the brake.

12. The hybrid drive unit for vehicles according to claim 11, wherein:

the second hybrid control means includes a means for reducing the braking force of the brake at an instant when a reaction torque established by the first motor generator is sufficiently raised.

13. The hybrid drive unit for vehicles according to claim 11, wherein:

the second hybrid control means includes a means for operating at least one of the second and third motor generators as a motor, by supplying the electric power generated by the first motor generator functioning as a generator to at least one of the second and third motor generators.

14. The hybrid drive unit for vehicles according to claim 11, wherein:

the second hybrid control means includes a means for operating the first motor generator as a generator when it rotates in the reverse direction, and for operating the first motor generator as a motor when it rotates in the forward direction.

15. A hybrid drive unit for vehicles, in which an engine, a first motor generator, and a wheel are connected to a power distribution device having a plurality of rotary elements capable of rotating differentially with each other, and which is capable of steplessly controlling a speed change ratio as a speed ratio of the rotary element connected to the engine and the rotary element connected to the wheel, wherein:

the power distribution device comprises a first rotary element functions as an input element, a second rotary element capable of functioning as a reaction element, a third rotary element capable of functioning as an another reaction element, and a fourth rotary element functions as an output element;

the engine is connected to the first rotary element, the first motor generator is connected to the second rotary element, and the wheel is connected to the second rotary element; and comprising:

a second motor generator connected to the third rotary element;

a third motor generator connected to any of said wheel and an another wheel;

an electric circuit for allowing exchange of electric power among individual motor generators; and a hybrid control means for operating at least one of the first and second motor generators as a generator to establish the reactive force against the engine torque, in case the engine torque is inputted to the first rotary element and transmitted to the wheel through the fourth rotary element.

16. The hybrid drive unit for vehicles according to claim 15, wherein:

the hybrid control means includes a means for operating at least one of the first and second motor generators as a generator to establish the reactive force against the engine torque, when the engine output is less than maximum.

17. The hybrid drive unit for vehicles according to claim 16, wherein:

the hybrid control means includes a means for selecting one of the first and second motor generators to be operated as a generator, whose output necessary for establishing the reactive force against the engine torque is relatively lower than that of the other one.

18. The hybrid drive unit for vehicles according to claim 1, wherein:

the power distribution device comprises a combined planetary gear mechanism, which is composed of two sets of planetary gear mechanisms, and in which four rotary elements of the planetary gear mechanisms are individually connected with each other; and in a connection status of the four rotary elements are as illustrated in a nomographic diagram, lines representing the first to fourth rotary elements are situated in a different position on a baseline, lines representing the first rotary element and the second rotary element are situated next to each other, and lines representing the second rotary element and the third rotary element are situated both outer ends.

19. A hybrid drive unit for vehicles, in which an engine, a first motor generator, and a wheel are connected to a power distribution device having a plurality of rotary elements capable of rotating differentially with each other, and which is capable of steplessly controlling a speed change ratio as a speed ratio of the rotary element connected to the engine and the rotary element connected to the wheel, wherein:

the power distribution device comprises a first rotary element functions as an input element, a second rotary element capable of functioning as a reaction element, a third rotary element capable of functioning as an another reaction element, and a fourth rotary element functions as an output element;

the engine is connected to the first rotary element, the first motor generator is connected to the second rotary element, and the wheel is connected to the second rotary element; and comprising:

a second motor generator connected to the third rotary element;

a third motor generator connected to any of said wheel and an another wheel; and an electric circuit for allowing exchange of electric power among individual motor generators, wherein:

the power distribution device comprises two sets of planetary gear mechanisms having an input element, an output element, and a reaction element capable of rotating differentially with one another;

the engine is connected to the input element of each planetary gear mechanism;

the front wheel is connected to the output element of each planetary gear mechanism;

the first motor generator is connected to the reaction element of one of the planetary gear mechanism; and the second motor generator is connected to the reaction element of the other planetary gear mechanism.

20. A hybrid drive unit for vehicles, in which an engine, a first motor generator, and a wheel are connected to a power distribution device having a plurality of rotary elements capable of rotating differentially with each other, and which is capable of steplessly controlling a speed change ratio as a speed ratio of the rotary element connected to the engine and the rotary element connected to the wheel, wherein:

the power distribution device comprises a first rotary element functions as an input element, a second rotary element capable of functioning as a reaction element, a third rotary element capable of functioning as an another reaction element, and a fourth rotary element functions as an output element;

the engine is connected to the first rotary element, the first motor generator is connected to the second rotary element, and the wheel is connected to the second rotary element; and comprising:

a second motor generator connected to the third rotary element;

a third motor generator connected to any of said wheel and an another wheel; and an electric circuit for allowing exchange of electric power among individual motor generators, wherein:

the power distribution device is constructed of:

a single pinion type planetary gear mechanism comprising a first sun gear as an external gear, a first ring gear as an internal gear arranged concentrically with the first sun gear, and a first carrier holding a pinion gear meshing with the first sun gear and the first ring gear; and a double pinion type planetary gear mechanism comprising a second sun gear as an external gear, a second ring gear as an internal gear arranged concentrically with the second sun gear, and a second carrier holding at least one pair of a pinion gear which is meshing with each other and which placed between the second sun gear and the second ring gear; and the first motor generator is connected with the first sun gear, the second motor generator is connected with the second sun gear, the engine is connected with the first and second carriers, and both first and second ring gears are connected with the wheel.

21. A hybrid drive unit for vehicles, in which an engine, a first motor generator, and a wheel are connected to a power distribution device having a plurality of rotary elements capable of rotating differentially with each other, and which is capable of steplessly controlling a speed change ratio as a speed ratio of the rotary element connected to the engine and the rotary element connected to the wheel, wherein:

the power distribution device comprises a first rotary element functions as an input element, a second rotary element capable of functioning as a reaction element, a third rotary element capable of functioning as an another reaction element, and a fourth rotary element functions as an output element;

the engine is connected to the first rotary element, the first motor generator is connected to the second rotary element, and the wheel is connected to the second rotary element; and comprising:

a second motor generator connected to the third rotary element;

a third motor generator connected to any of said wheel and an another wheel;

an electric circuit for allowing exchange of electric power among individual motor generators; and a first hybrid control device for transmitting engine torque to the second rotary element by operating the second motor generator as a motor or a generator to establish reactive force against the engine torque, while transmitting a torque of the third motor generator to the wheel or the another wheel by operating the third motor generator as a motor, in case of controlling the speed of the second rotary element lower than that of the first rotary element while transmitting the engine torque to the first rotary element.

22. The hybrid drive unit for vehicles according to claim 21, wherein:

the first hybrid control device includes a determining device for determining an amount of the electric power in the electric circuit, in case the second motor generator functions as a motor or a generator to establish the reactive force against the engine torque; and the second motor generator functions as a motor or a generator in case the amount of the electric power in the electric circuit is determined to be reduced.

23. The hybrid drive unit for vehicles according to claim 22, wherein:

the determining device determines the amount of the electric power in the electric circuit, in case the second motor generator functions as a motor or a generator to establish the reactive force against the engine torque when the engine output is maximum.

24. The hybrid drive unit for vehicles according to claim 21, wherein:

the first hybrid control device operates the third motor generator as a motor, by supplying the electric power generated by the second motor generator to the third motor generator, in case the second motor generator functions as a generator.

25. A hybrid drive unit for vehicles, in which an engine, a first motor generator, and a wheel are connected to a power distribution device having a plurality of rotary elements capable of rotating differentially with each other, and which is capable of steplessly controlling a speed change ratio as a speed ratio of the rotary element connected to the engine and the rotary element connected to the wheel, wherein:

the power distribution device comprises a first rotary element functions as an input element, a second rotary element capable of functioning as a reaction element, a third rotary element capable of functioning as an another reaction element, and a fourth rotary element functions as an output element;

the engine is connected to the first rotary element, the first motor generator is connected to the second rotary element, and the wheel is connected to the second rotary element; and comprising:

a second motor generator connected to the third rotary element;

a third motor generator connected to any of said wheel and an another wheel;

an electric circuit for allowing exchange of electric power among individual motor generators; and a hybrid control device for transmitting at least one of the torque of the second and third motor generators to the wheel or the another wheel, by operating the first motor generator as a generator to establish the reactive force against the engine torque, and by operating at least one of the second and third motor generators as a motor, in case of controlling the speed of the second rotary element higher than that of the first rotary element while transmitting the engine torque to the first rotary element.

26. The hybrid drive unit for vehicles according to claim 25, wherein:

the hybrid control device includes a determining device for determining the amount of the electric power in the electric circuit, in case the first motor generator functions as a motor or a generator to establish the reactive force against the engine torque; and the first motor generator functions as a motor or a generator, in case the amount of the electric power in the electric circuit is determined to be reduced.

27. The hybrid drive unit for vehicles according to claim 26, wherein:

the determining device determines the amount of the electric power in the electric circuit, in case the first motor generator functions as motor or a generator to establish the reactive force against the engine torque when the engine output is maximum.

28. The hybrid drive unit for vehicles according to claim 25, wherein:

the hybrid control device operates at least one of the second and third motor generators as a motor by supplying the electric power generated by the first motor generator to at least one of the second and third motor generators, in case the first motor generator functions as a generator.

29. A hybrid drive unit for vehicles, in which an engine, a first motor generator, and a wheel are connected to a power distribution device having a plurality of rotary elements capable of rotating differentially with each other, and which is capable of steplessly controlling a speed change ratio as a speed ratio of the rotary element connected to the engine and the rotary element connected to the wheel, wherein:

the power distribution device comprises a first rotary element functions as an input element, a second rotary element capable of functioning as a reaction element, a third rotary element capable of functioning as an another reaction element, and a fourth rotary element functions as an output element;

the engine is connected to the first rotary element, the first motor generator is connected to the second rotary element, and the wheel is connected to the second rotary element; and comprising:

a second motor generator connected to the third rotary element;

a third motor generator connected to any of said wheel and an another wheel; and an electric circuit for allowing exchange of electric power among individual motor generators, further comprising:

a brake for selectively halting revolutions of the first rotary element and the engine; and a hybrid control device for allowing the brake to function as a reaction element against at least one of the second and third motor generators, by using the brake to halt the revolutions of the first rotary element and the engine, in case at least one of the second and third motor generators functions as a motor and the torque thereof is transmitted to the wheel.

30. The hybrid drive unit for vehicles according to claim 29, further comprising:

a second hybrid control device for rotating the engine autonomously, by allowing the first motor generator to function as a reaction element against at least one of the second and third motor generators, by operating the first motor generator as a generator, and by reducing the braking force of the brake gradually, by increasing the speed of the engine by controlling the speed of the first motor generator, and by burning fuel, in case of starting the engine when the first rotary member and the engine are halted by the brake.

31. The hybrid drive unit for vehicles according to claim 30, wherein:

the second hybrid control device reduces the braking force of the brake at an instant when a reaction torque established by the first motor generator is sufficiently raised.

32. The hybrid drive unit for vehicles according to claim 30, wherein:

the second hybrid control device operates at least one of the second and third motor generators as a motor, by supplying the electric power generated by the first motor generator functioning as a generator to at least one of the second and third motor generators.

33. The hybrid drive unit for vehicles according to claim 30, wherein:

the second hybrid control device operates the first motor generator as a generator when it rotates in the reverse direction, and for operating the first motor generator as a motor when it rotates in the forward direction.

34. A hybrid drive unit for vehicles, in which an engine, a first motor generator, and a wheel are connected to a power distribution device having a plurality of rotary elements capable of rotating differentially with each other, and which is capable of steplessly controlling a speed change ratio as a speed ratio of the rotary element connected to the engine and the rotary element connected to the wheel, wherein:

the power distribution device comprises a first rotary element functions as an input element, a second rotary element capable of functioning as a reaction element, a third rotary element capable of functioning as an another reaction element, and a fourth rotary element functions as an output element;

the engine is connected to the first rotary element, the first motor generator is connected to the second rotary element, and the wheel is connected to the second rotary element; and comprising:

a second motor generator connected to the third rotary element;

a third motor generator connected to any of said wheel and an another wheel;

an electric circuit for allowing exchange of electric power among individual motor generators; and a hybrid control device for operating at least one of the first and second motor generators as a generator to establish the reactive force against the engine torque, in case the engine torque is inputted to the first rotary element and transmitted to the wheel through the fourth rotary element.

35. The hybrid drive unit for vehicles according to claim 34, wherein:

the hybrid control device operates at least one of the first and second motor generators as a generator to establish the reactive force against the engine torque, when the engine output is less than maximum.

36. The hybrid drive unit for vehicles according to claim 35, wherein:

the hybrid control device includes a selecting device for selecting one of the first and second motor generators to be operated as a generator, whose output necessary for establishing the reactive force against the engine torque is relatively lower than that of the other one.

* * * * *